(12) United States Patent
Yuan

(10) Patent No.: US 12,035,344 B2
(45) Date of Patent: Jul. 9, 2024

(54) REFERENCE SIGNAL MEASUREMENT METHOD AND TERMINAL DEVICE

(71) Applicant: HUAWEI TECHNOLOGIES CO., LTD., Guangdong (CN)

(72) Inventor: Pu Yuan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 593 days.

(21) Appl. No.: 17/342,919

(22) Filed: Jun. 9, 2021

(65) Prior Publication Data

US 2021/0298039 A1 Sep. 23, 2021

Related U.S. Application Data

(63) Continuation of application No. PCT/CN2019/120932, filed on Nov. 26, 2019.

(30) Foreign Application Priority Data

Dec. 10, 2018 (CN) .......................... 201811503900.2

(51) Int. Cl.
*H04W 4/40* (2018.01)
*H04L 5/00* (2006.01)
(Continued)

(52) U.S. Cl.
CPC ......... *H04W 72/542* (2023.01); *H04L 5/0051* (2013.01); *H04W 4/40* (2018.02);
(Continued)

(58) Field of Classification Search
CPC ..... H04W 72/542; H04W 4/40; H04W 24/10; H04W 56/001; H04W 72/0446;
(Continued)

(56) References Cited

U.S. PATENT DOCUMENTS 10,638,380 B2 * 4/2020 Lu ..................... H04W 36/0072
2017/0034842 A1 2/2017 Xiaodong et al.
(Continued)

FOREIGN PATENT DOCUMENTS

CN 103702346 A 4/2014
CN 104159242 A 11/2014
(Continued)

OTHER PUBLICATIONS

Huawei, HiSilicon, Discussion on Reference Signal for Sidelink Control and Data Channel Design. 3GPP TSG RAN WG1 Meeting #94bis, Chengdu, China, Oct. 8-12, 2018, R1-1810710, 5 pages.

*Primary Examiner* — Julio R Perez
(74) *Attorney, Agent, or Firm* — WOMBLE BOND DICKINSON (US) LLP

(57) ABSTRACT

Embodiments of this application provide a reference signal measurement method. The method includes: obtaining, by a first terminal device, measurement configuration information; sending, by the first terminal device, the measurement configuration information to a second terminal device, where the measurement configuration information is used to indicate the second terminal device to measure, based on the measurement configuration information, a reference signal received by the second terminal device from the first terminal device, to obtain a measurement result of the reference signal; sending, by the first terminal device, the reference signal to the second terminal device; and receiving, by the first terminal device, the measurement result that is of the reference signal and that is sent by the second terminal device.

20 Claims, 8 Drawing Sheets

(51) Int. Cl.
*H04W 24/10* (2009.01)
*H04W 56/00* (2009.01)
*H04W 72/0446* (2023.01)
*H04W 72/0453* (2023.01)
*H04W 72/1263* (2023.01)
*H04W 72/542* (2023.01)

(52) U.S. Cl.
CPC ......... *H04W 24/10* (2013.01); *H04W 56/001* (2013.01); *H04W 72/0446* (2013.01); *H04W 72/0453* (2013.01); *H04W 72/1263* (2013.01)

(58) Field of Classification Search
CPC ......... H04W 72/0453; H04W 72/1263; H04W 24/08; H04W 56/0015; H04W 92/18; H04W 4/70; H04L 5/0051; H04L 5/0048
See application file for complete search history.

(56) References Cited

U.S. PATENT DOCUMENTS

| | | | | |
|---|---|---|---|---|
| 2017/0163470 A1* | 6/2017 | Seo | ........... | H04W 4/70 |
| 2018/0288756 A1* | 10/2018 | Xia | ........... | H04W 72/0453 |
| 2019/0082334 A1* | 3/2019 | Nagaraja | ........... | H04B 7/088 |
| 2019/0174436 A1* | 6/2019 | da Silva | ........... | H04W 24/10 |
| 2021/0298039 A1* | 9/2021 | Yuan | ........... | H04W 56/001 |
| 2021/0367741 A1* | 11/2021 | Yiu | ........... | H04L 5/0007 |

FOREIGN PATENT DOCUMENTS

| | | | | |
|---|---|---|---|---|
| CN | 106454927 A | 2/2017 | | |
| CN | 108289311 A | 7/2018 | | |
| CN | 108631917 A | 10/2018 | | |
| WO | WO-2020222443 A1 * | 11/2020 | ........... | H04L 1/0003 |

* cited by examiner

REFERENCE SIGNAL MEASUREMENT METHOD AND TERMINAL DEVICE

CROSS-REFERENCE TO RELATED APPLICATIONS

This application is a continuation of International Application No. PCT/CN2019/120932, filed on Nov. 26, 2019, which claims priority to Chinese Patent Application No. 201811503900.2, filed on Dec. 10, 2018. The disclosures of the aforementioned applications are hereby incorporated by reference in their entireties.

TECHNICAL FIELD

This application relates to the communications field, and in particular, to a reference signal measurement method and a terminal device.

BACKGROUND

In a conventional 4th-generation (4G) mobile communications network, a base station usually allocates a resource in specific time and specific frequency domain to a specific terminal for use. To ensure communication quality of the terminal, the base station needs to learn of a position of a time-frequency resource with relatively good communication quality, and allocates the resource to the terminal.

To measure the communication quality of the time-frequency resource, the base station may send a reference signal RS) and reference signal measurement configuration information to the terminal device, so that the terminal device measures the reference signal based on the reference signal measurement configuration information, and reports a measurement result to the base station, thereby providing a reference for the base station to perform time-frequency resource scheduling.

Communication between terminal devices (D2D) can be implemented in a 5th-generation (5G) mobile communications technology. D2D is a technology in which terminal devices directly communicate with each other. The communication between terminal devices is performed on a sidelink, without a need of forwarding by a base station. In a current reference signal measurement technology, quality of a time-frequency resource used when a terminal communicates with a base station is measured. Because on a sidelink, however, terminals directly communicate with each other, the current reference signal measurement technology is not applicable to the sidelink.

SUMMARY

Embodiments of this application provide a reference signal measurement method and a terminal device. A second terminal device measures, based on obtained measurement configuration information, a reference signal sent by a first terminal device. Therefore, a measurement result reflects quality of a time-frequency resource used when the first terminal communicates with the second terminal. In this way, a reference signal measurement method applicable to a sidelink is provided.

According to a first aspect, an embodiment of the application provides a reference signal measurement method. The method includes: After obtaining measurement configuration information, a first terminal device may send the measurement configuration information to a second terminal device. The measurement configuration information may be obtained by the first terminal device from a base station, or may be generated by the first terminal device, and is used to indicate the second terminal device to measure, based on the measurement configuration information, a reference signal received by the second terminal device from the first terminal device, to obtain a measurement result of the reference signal. The first terminal device may further send the reference signal to the second terminal device, and receive the measurement result that is of the reference signal and that is sent by the second terminal device.

In this application, the first terminal device sends the measurement configuration information and the reference signal to the second terminal device, so that the second terminal device determines the measurement result of the reference signal based on the measurement configuration information. Because the reference signal is obtained from the first terminal device, the measurement result reflects quality of a time-frequency resource used when the first terminal communicates with the second terminal. In this way, a reference signal measurement method applicable to a sidelink is provided.

In an embodiment, when the base station allocates a time-frequency resource, that the first terminal device obtains the measurement configuration information may include: The first terminal device receives the measurement configuration information sent by the base station, and after receiving the measurement result that is of the reference signal and that is sent by the second terminal device, sends the measurement result of the reference signal to the base station. The measurement configuration information may include a time-frequency resource list, a terminal device list, a type of a to-be-measured reference signal, a measurement window configuration, a measurement configuration parameter, and a reference signal identifier; the time-frequency resource list is used to indicate a position of a to-be-measured time-frequency resource; the terminal device list includes at least one terminal device identifier that corresponds one-to-one to at least one terminal device, where terminal devices included in the at least one terminal device may all be in a same cell, and the at least one terminal device identifier includes an identifier of the first terminal device; the type of the to-be-measured reference signal is used to indicate a type of the reference signal; the measurement window configuration is used to indicate a measurement time interval; the measurement configuration parameter is used to determine a quantity of measurement results that need to be reported and types of the measurement results; and the reference signal identifier is used to determine, in a plurality of reference signals sent by the first terminal device, the reference signal that needs to be measured by the second terminal device.

In this application, after receiving the measurement configuration information sent by the base station, the first terminal device forwards the measurement configuration information to the second terminal device. The first terminal device receives the measurement result sent by the second terminal device, and sends the measurement result to the base station. In this case, the second terminal device can obtain a time-frequency resource allocated by the base station without communicating with the base station. Therefore, even if the second terminal device does not access the cell, the second terminal device can obtain the time-frequency resource allocated by the base station, and use the time-frequency resource to perform D2D communication, thereby extending an application scenario of the reference signal measurement method, and improving integrity of this solution.

In an embodiment, the method further includes: The first terminal device may send a sidelink synchronization signal SLSS to a plurality of terminal devices in a group in a multicast manner, or may send the SLSS to a plurality of terminal devices in a cell in a broadcast manner. The plurality of terminal devices in the group or in the cell include the second terminal device. Therefore, the first terminal device may receive feedback information sent by the second terminal device, where the feedback information is used by the first terminal device to determine that the second terminal device has performed a synchronization operation based on the SLSS. The first terminal device may send indication information to the base station based on the feedback information, where the indication information is used to indicate the base station to send the measurement configuration information to the first terminal device.

In this application, the first terminal actively sends the SLSS to the plurality of terminal devices in the group or in the cell. When receiving the feedback information sent by the second terminal device, the first terminal sends the indication information to the base station, to obtain the measurement configuration information from the base station. After receiving the feedback information, the first terminal may learn that the second terminal device has a communication requirement. In this case, the first terminal sends the measurement information for obtaining the measurement configuration reference signal to the base station, thereby avoiding a waste of communication resources. Actively sending the SLSS to the plurality of terminal devices in the group helps a terminal device that newly joins the group obtain a communications resource in a timely manner. Further, because the plurality of terminal devices in the cell may include both terminal devices in the group and a terminal device that has not joined the group, a terminal device that newly enters the cell can obtain a communication resource in a timely manner, thereby improving integrity of this solution.

In an embodiment, when the terminal device autonomously selects a time-frequency resource, that the first terminal device obtains the measurement configuration information may include: The first terminal device generates the measurement configuration information. The measurement configuration information may include a terminal device identifier, a type of a to-be-measured reference signal, a measurement window configuration, a measurement configuration parameter, and a reference signal identifier; the terminal device identifier is an identifier of the first terminal device; the type of the to-be-measured reference signal is used to indicate a type of the reference signal; the measurement window configuration is used to indicate a measurement time interval; the measurement configuration parameter is used to determine a quantity of measurement results that need to be reported and types of the measurement results; and the reference signal identifier is an identifier of the reference signal sent by the first terminal device to the second terminal device.

In this application, information included in the measurement configuration information generated by the first terminal device is provided when a connection has not been established between terminal devices that perform D2D communication, thereby increasing feasibility of this solution. In addition, because the first terminal device allocates some beams to communicate with other terminal devices than the second terminal device, the first terminal device may include, in the measurement configuration information based on beam allocation of the first terminal device, the identifier of the reference signal sent to the second terminal device, to prevent the second terminal device from measuring all beams. This saves a measurement time of the second terminal device, and improves efficiency of a reference signal measurement process.

In an embodiment, the method may further include: The first terminal device may send a sidelink synchronization signal SLSS to a plurality of terminal devices in a group in a multicast manner, or may send the SLSS to a plurality of terminal devices in a cell in a broadcast manner. The plurality of terminal devices in the group or in the cell include the second terminal device. The first terminal device receives feedback information sent by the second terminal device, where the feedback information is used by the first terminal device to determine that the second terminal device has performed a synchronization operation based on the SLSS. That the first terminal device sends the measurement configuration information to the second terminal device includes: The first terminal device sends the measurement configuration information to the second terminal device based on the feedback information.

In this application, when the terminal device autonomously selects a time-frequency resource, the first terminal device may alternatively actively send the SLSS to the plurality of terminal devices, to send the measurement configuration information to the second terminal device after receiving the feedback information, thereby avoiding a waste of communication resources. In addition, actively sending the SLSS facilitates quick synchronization between terminal devices and establishment of a communication connection.

In an embodiment, when the terminal device autonomously selects a time-frequency resource, that the first terminal device obtains the measurement configuration information may include: The first terminal device generates the measurement configuration information. The measurement configuration information may alternatively include a terminal device list, a type of a to-be-measured reference signal, a measurement window configuration, a measurement configuration parameter, and a reference signal identifier; the terminal device list includes at least two terminal device identifiers that correspond one-to-one to at least two terminal devices, where the at least two terminal device identifiers are determined by the first terminal device; the type of the to-be-measured reference signal is used to indicate a type of the reference signal; the measurement window configuration is used to indicate a measurement time interval; the measurement configuration parameter is used to determine a quantity of measurement results that need to be reported and types of the measurement results; and the reference signal identifier is used to determine, in a plurality of reference signals sent by the first terminal device, the reference signal that needs to be measured by the second terminal device.

In this application, because a connection has been established between terminal devices that perform D2D, the measurement configuration information generated by the first terminal device not only includes an identifier of the first terminal device, but also includes identifiers of other terminal devices in a cell in which the first terminal device is located. In addition, the second terminal device may learn of positions of unallocated time-frequency resources in a resource pool. In this case, the second terminal device may learn of reference signal positions, so that the second terminal device can measure reference signals of the other terminal devices at the reference signal positions based on the identifiers of the other terminal devices, thereby helping the second communications device obtain better communication experience. In addition, in this scenario, because the terminal device autonomously selects the time-frequency resource, a process in which the second terminal device changes a terminal device with which the second terminal device intends to communicate is more flexible.

In an embodiment, that the first terminal device sends the measurement configuration information to the second terminal device may include: The first terminal device sends synchronization information to the second terminal device, where the synchronization information includes a sidelink synchronization signal SLSS and the measurement configuration information, and the SLSS is used by the second terminal device to perform a synchronization operation based on the SLSS.

In this application, the second terminal device can synchronize, with no need to access the first terminal device, with the first terminal device based on the SLSS actively sent by the first terminal device, and can learn of the identifier of the first terminal device and the identifier of the reference signal of the first terminal device based on the measurement configuration information actively sent by the first terminal device. Further, the second terminal device learns of the reference signal of the first terminal device at the position of the unallocated time-frequency resource in the resource pool. Alternatively, the second terminal device sends the feedback information to the first terminal device to cause the first terminal device to send the reference signal, and sends the measurement result to the first terminal device after measuring the reference signal of the first terminal device. This helps the first terminal device quickly establish connections to other terminal devices in the cell.

In an embodiment, that the first terminal device sends the reference signal to the second terminal device may include: The first terminal device may send the reference signal to a plurality of terminal devices in a group in a multicast manner, where the plurality of terminal devices in the group include the second terminal device. Alternatively, the first terminal device may send the reference signal to a plurality of terminal devices in a cell in a broadcast manner, where the plurality of terminal devices in the cell include the second terminal device.

In this application, alternatively, the first terminal device may actively send the reference signal without receiving a feedback. Because the first terminal device is any one of the plurality of terminal devices in the group or in the cell, after accessing a first terminal device and obtaining measurement configuration information, the second terminal device can obtain, with no need to access other first terminal devices in the group or in the cell, reference signals of the other first terminal devices at positions of time-frequency resources allocated by the base station to the other first terminal devices, and measure the reference signal, thereby saving communication resources.

In an embodiment, that the first terminal device sends the reference signal to the second terminal device includes: The first terminal device may send a sidelink synchronization signal SLSS to a plurality of terminal devices in a group in a multicast manner, or may send an SLSS to a plurality of terminal devices in a cell in a broadcast manner. The plurality of terminal devices in the group or in the cell include the second terminal device. Therefore, the first terminal device may receive feedback information sent by the second terminal device, where the feedback information is used by the first terminal device to determine that the second terminal device has performed a synchronization operation based on the SLSS. The first terminal device may send the reference signal to the second terminal device based on the feedback information.

In this application, after receiving the feedback information of the second terminal device, the first terminal device learns that the second terminal device has performed the synchronization operation based on the SLSS, and then sends the reference signal to the second terminal device. This avoids a waste of communication resources caused because the second terminal device cannot process the received reference signal.

According to a second aspect, an embodiment of the application provides a reference signal measurement method. The method may include: A first terminal device may send indication information to a third terminal device, where the indication information is used to indicate the third terminal device to send measurement configuration information to a second terminal device. The first terminal device sends a reference signal to the second terminal device, where the measurement configuration information is used by the second terminal device to measure, based on the measurement configuration information, the reference signal received by the second terminal device from the first terminal device, to obtain a measurement result of the reference signal. The third terminal device and the first terminal device are in a same group, and the third terminal device is configured to allocate time-frequency resources to a plurality of terminals in the group.

In this application, the first terminal device may send the indication information to the third terminal device, so that the third indication information sends the measurement configuration information to the second terminal device. The second terminal device may measure, based on the measurement configuration information, the reference signal sent by the first terminal device, to obtain the measurement result of the reference signal, and directly send the measurement result to the third terminal device, so that the second terminal device can quickly join the group.

In an embodiment, the method may further include: The first terminal device may send a sidelink synchronization signal SLSS to a plurality of terminal devices in a group in a multicast manner, where the plurality of terminal devices in the group include the second terminal device, so that the first terminal device can receive feedback information sent by the second terminal device. The feedback information is used by the first terminal device to determine that the second terminal device has performed a synchronization operation based on the SLSS. The first terminal device may send the indication information to the third terminal device based on the feedback information. The indication information is used to indicate the third terminal device to send the measurement configuration information to the second terminal device.

In this application, after determining that the second terminal device has performed the synchronization operation, the first terminal device indicate the third terminal device to send the measurement configuration information to the second terminal device. This avoids a case in which the second terminal device cannot perform processing after receiving the measurement configuration information, that is, avoids a waste of communication resources, and also helps reduce a workload of the third terminal device.

In an embodiment, that the first terminal device sends the reference signal to the second terminal device may include: The first terminal device may send the reference signal to a plurality of terminal devices in a group in a multicast manner, where the first terminal device is any terminal device in the group, and the plurality of terminal devices in the group include the second terminal device.

In this application, after obtaining measurement configuration information by using any first terminal device, the second terminal device may determine positions of reference signals of other first terminal devices in the group based on a correspondence between a terminal device identifier and a position of a time-frequency resource in a time-frequency resource list that are in the measurement configuration information. Because the first terminal device actively sends the reference signal, the second terminal device may measure reference signals sent by other terminal devices in a terminal device list with no need to access other terminal devices in the group, to select a first terminal device with best communication quality and communicate with the first terminal device, thereby obtaining better communication experience.

In an embodiment, that the first terminal device sends the reference signal to the second terminal device may alternatively include: The first terminal device sends a sidelink synchronization signal SLSS to a plurality of terminal devices in a group in a multicast manner, where the plurality of terminal devices in the group include the second terminal device. The first terminal device receives feedback information sent by the second terminal device, where the feedback information is used by the first terminal device to determine that the second terminal device has performed a synchronization operation based on the SLSS. The first terminal device sends the reference signal to the second terminal device based on the feedback information.

In this application, when it is determined that the second terminal device has performed the synchronization operation, the reference signal is sent to the second terminal device, so that the reference signal is prevented from being sent to the second terminal device when the second terminal device does not have a reference signal processing capability, thereby avoiding a waste of communication resources.

In an embodiment, the measurement configuration information includes a time-frequency resource list, a terminal device list, a type of a to-be-measured reference signal, a measurement window configuration, a measurement configuration parameter, and a reference signal identifier; a time-frequency resource included in the time-frequency resource list is a time-frequency resource available to a group to which the second terminal device belongs, and the time-frequency resource list is used to indicate a position of a to-be-measured time-frequency resource; the terminal device list includes at least one terminal device identifier that corresponds one-to-one to at least one terminal device, each of the at least one terminal device is in the group, and the at least one terminal device identifier includes an identifier of the first terminal device; the type of the to-be-measured reference signal is used to indicate a type of the reference signal; the measurement window configuration is used to indicate a measurement time interval; the measurement configuration parameter is used to determine a quantity of measurement results that need to be reported and types of the measurement results; and the reference signal identifier is used to determine, in a plurality of reference signals sent by the first terminal device, the reference signal that needs to be measured by the first terminal.

In this application, the measurement configuration information sent by the third terminal device not only includes the identifier of the first terminal device and a time-frequency resource available to the first terminal device, but also includes identifiers of other terminal devices in the group to which the first terminal device belongs and a corresponding time-frequency resource. In this way, after completing synchronous access, the second terminal device can obtain, based on the measurement configuration information sent by the third terminal device, time-frequency resource positions of reference signals of the other terminal devices in the group to which the first terminal device belongs, and further can measure, with no need to access each of the other terminal devices in the group, quality of communication with the other terminal devices in the group, thereby saving communication resources, and helping the second terminal device obtain better communication experience.

According to a third aspect, an embodiment of the application provides a reference signal measurement method. The method may include: A third terminal device may receive indication information sent by a first terminal device. Because the indication information is used to indicate the third terminal device to send measurement configuration information to a second terminal device, the third terminal device may send the measurement configuration information to the second terminal device. The measurement configuration information is used to indicate the second terminal device to measure, based on the measurement configuration information, a reference signal received by the second terminal device from the first terminal device, to obtain a measurement result of the reference signal. The third terminal device receives the measurement result that is of the reference signal and that is sent by the second terminal device. The third terminal device and the first terminal device are in a same group, the third terminal device is configured to allocate time-frequency resources to a plurality of terminals in the group, and the first terminal device is any terminal device in the group.

In this application, after receiving the indication information sent by the first terminal device, the third terminal device may send the measurement configuration information to the second terminal device, so that the second terminal device can measure, based on the measurement configuration information, the reference signal sent by the first terminal device, to obtain the measurement result of the reference signal. Then, the third terminal device receives the measurement result of the reference signal, so that the second terminal device can quickly join the group.

In an embodiment, the measurement configuration information includes a time-frequency resource list, a terminal device list, a type of a to-be-measured reference signal, a measurement window configuration, a measurement configuration parameter, and a reference signal identifier; a time-frequency resource included in the time-frequency resource list is a time-frequency resource available to a group to which the second terminal device belongs, and the time-frequency resource list is used to indicate a position of a to-be-measured time-frequency resource; the terminal device list includes at least one terminal device identifier that corresponds one-to-one to at least one terminal device, each of the at least one terminal device is in the group, and the at least one terminal device identifier includes an identifier of the first terminal device; the type of the to-be-measured reference signal is used to indicate a type of the reference signal; the measurement window configuration is used to indicate a measurement time interval; the measurement configuration parameter is used to determine a quantity of measurement results that need to be reported and types of the measurement results; and the reference signal identifier is used to determine, in a plurality of reference signals sent by the first terminal device, the reference signal that needs to be measured by the first terminal.

In this application, the measurement configuration information sent by the third terminal device not only includes the identifier of the first terminal device and a time-frequency resource available to the first terminal device, but also includes identifiers of other terminal devices in the group to which the first terminal device belongs and a corresponding time-frequency resource. In this way, after completing synchronous access, the second terminal device can obtain, based on the measurement configuration information sent by the third terminal device, time-frequency resource positions of reference signals of the other terminal devices in the group to which the first terminal device belongs, and further can measure, with no need to access each of the other terminal devices in the group, quality of communication with the other terminal devices in the group, thereby saving communication resources. In addition, according to an embodiment of the application, the second terminal device can communicate with a plurality of terminal devices in a group when initially joining the group, thereby helping the second terminal device obtain better communication experience.

According to a fourth aspect, an embodiment of the application provides a reference signal measurement method. The method includes: A second terminal device may receive measurement configuration information from a first terminal device. The measurement configuration information is used to indicate the second terminal device to measure, based on the measurement configuration information, a reference signal received by the second terminal device from the first terminal device. After receiving the reference signal from the first terminal device, the second terminal device may determine a measurement result of the reference signal based on the measurement configuration information and the reference signal, and send the measurement result of the reference signal to the first terminal device.

In this application, the second terminal device receives the measurement configuration information and the reference signal that are sent by the first terminal device, and determines the measurement result of the reference signal based on the measurement configuration information. Because the reference signal is obtained from the first terminal device, the measurement result reflects quality of a time-frequency resource used when the first terminal communicates with the second terminal. In this way, a reference signal measurement method applicable to a sidelink is provided.

In an embodiment, the method further includes: When a base station allocates a time-frequency resource, the second terminal device may blindly detect a sidelink synchronization signal SLSS, and obtain the SLSS from the first terminal device. After performing a synchronization operation based on the SLSS, the second terminal device may send feedback information to the first terminal device, where the feedback information may be used by the first terminal device to determine that the second terminal device has performed a synchronization operation based on the SLSS, and the feedback information may further be used to indicate the first terminal device to obtain the measurement configuration information from the base station. The measurement configuration information includes a time-frequency resource list, a terminal device list, a type of a to-be-measured reference signal, a measurement window configuration, a measurement configuration parameter, and a reference signal identifier; the time-frequency resource list is used to indicate a position of a to-be-measured time-frequency resource; the terminal device list includes at least one terminal device identifier that corresponds one-to-one to at least one terminal device, and the at least one terminal device identifier includes an identifier of the first terminal device; the type of the to-be-measured reference signal is used to indicate a type of the reference signal; the measurement window configuration is used to indicate a measurement time interval; the measurement configuration parameter is used to determine a quantity of measurement results that need to be reported and types of the measurement results; and the reference signal identifier is used to determine, in a plurality of reference signals sent by the first terminal device, the reference signal that needs to be measured by the second terminal device.

In this application, when the base station allocates the time-frequency resource, the second terminal device can also send the feedback information to the first terminal device after performing the synchronization operation based on the SLSS sent by the first terminal device, to obtain the measurement configuration information from the first terminal device side and measure the reference signal sent by the first terminal device. In this way, reference signal measurement can be completed without communicating with the base station. Therefore, even if the second terminal device does not access the cell, the second terminal device can obtain the time-frequency resource allocated by the base station, and use the time-frequency resource to perform D2D communication, thereby extending an application scenario of the reference signal measurement method, and improving integrity of this solution.

In an embodiment, the method may further include: When the terminal device autonomously selects a time-frequency resource, the second terminal device may blindly detect a sidelink synchronization signal SLSS, and obtain the SLSS from the first terminal device. After performing a synchronization operation based on the SLSS, the second terminal device may send feedback information to the first terminal device, where the feedback information may be used to indicate the first terminal device to send the measurement configuration information to the second terminal device, and the feedback information may be further used by the first terminal device to determine that the second terminal device has performed a synchronization operation based on the SLSS. The measurement configuration information includes a terminal device identifier, a type of a to-be-measured reference signal, a measurement window configuration, a measurement configuration parameter, and a reference signal identifier; the terminal device identifier is an identifier of the first terminal device; the type of the to-be-measured reference signal is used to indicate a type of the reference signal; the measurement window configuration is used to indicate a measurement time interval; the measurement configuration parameter is used to determine a quantity of measurement results that need to be reported and types of the measurement results; and the reference signal identifier is an identifier of the reference signal sent by the first terminal device to the second terminal device.

In this application, information included in the measurement configuration information generated by the first terminal device is provided when a connection has not been established between terminal devices that perform D2D communication, thereby increasing feasibility of this solution. In addition, because the first terminal device allocates some beams to communicate with other terminal devices than the second terminal device, the first terminal device may include, in the measurement configuration information based on beam allocation of the first terminal device, the identifier of the reference signal sent to the second terminal device, to prevent the second terminal device from measuring all beams. This saves a measurement time of the second terminal device, and improves efficiency of a reference signal measurement process.

In an embodiment, when the terminal device autonomously selects the time-frequency resource, the measurement configuration information may alternatively include a terminal device list, a type of a to-be-measured reference signal, a measurement window configuration, a measurement configuration parameter, and a reference signal identifier; the terminal device list includes at least two terminal device identifiers that correspond one-to-one to at least two terminal devices, where the at least two terminal device identifiers are determined by the first terminal device; the type of the to-be-measured reference signal is used to indicate a type of the reference signal; the measurement window configuration is used to indicate a measurement time interval; the measurement configuration parameter is used to determine a quantity of measurement results that need to be reported and types of the measurement results; and the reference signal identifier is used to determine, in a plurality of reference signals sent by the first terminal device, the reference signal that needs to be measured by the second terminal device.

In this application, because a connection has been established between terminal devices that perform D2D, the measurement configuration information generated by the first terminal device not only includes an identifier of the first terminal device, but also includes identifiers of other terminal devices in a cell in which the first terminal device is located. In addition, the second terminal device may learn of positions of unallocated time-frequency resources in a resource pool. In this case, the second terminal device may learn of reference signal positions, so that the second terminal device can measure reference signals of the other terminal devices at the reference signal positions based on the identifiers of the other terminal devices, thereby helping the second communications device obtain better communication experience. In addition, in this scenario, because the terminal device autonomously selects the time-frequency resource, a process in which the second terminal device changes a terminal device with which the second terminal device intends to communicate is more flexible.

In an embodiment, that the second terminal device receives the measurement configuration information from the first terminal device includes: The second terminal device receives synchronization information sent by the first terminal device, where the synchronization information includes an SLSS and the measurement configuration information, and the SLSS is used by the second terminal device to perform a synchronization operation based on the SLSS.

In this application, the second terminal device can synchronize, with no need to access the first terminal device, with the first terminal device based on the SLSS actively sent by the first terminal device, and can learn of the identifier of the first terminal device and the identifier of the reference signal of the first terminal device based on the measurement configuration information actively sent by the first terminal device. Further, the second terminal device learns of the reference signal of the first terminal device at the position of the unallocated time-frequency resource in the resource pool. Alternatively, the second terminal device sends the feedback information to the first terminal device to cause the first terminal device to send the reference signal, and sends the measurement result to the first terminal device after measuring the reference signal of the first terminal device. This helps the first terminal device quickly establish connections to other terminal devices in the cell.

According to a fifth aspect, an embodiment of the application provides a reference signal measurement method. The method includes: When a third terminal device allocates a time-frequency resource, a second terminal device may receive measurement configuration information from the third terminal device, where the measurement configuration information is used to indicate the second terminal device to measure, based on the measurement configuration information, a reference signal received by the second terminal device from a first terminal device; and receive the reference signal from the first terminal device. After determining a measurement result of the reference signal based on the measurement configuration information and the reference signal, the second terminal device may send the measurement result of the reference signal to the third terminal device. The third terminal device and the first terminal device are in a same group, the third terminal device is configured to allocate time-frequency resources to a plurality of terminals in a group, and the first terminal device is any terminal device in the group.

In this application, the second terminal device may receive the measurement configuration information sent by the third terminal device, measure, based on the measurement configuration information, the reference signal sent by the first terminal device, to obtain the measurement result of the reference signal, and then send the measurement result of the reference signal to the third terminal device, so that the second terminal device can quickly join the group.

In an embodiment, the measurement configuration information includes a time-frequency resource list, a terminal device list, a type of a to-be-measured reference signal, a measurement window configuration, a measurement configuration parameter, and a reference signal identifier; a time-frequency resource included in the time-frequency resource list is a time-frequency resource available to a group to which the second terminal device belongs, and the time-frequency resource list is used to indicate a position of a to-be-measured time-frequency resource; the terminal device list includes at least one terminal device identifier that corresponds one-to-one to at least one terminal device, each of the at least one terminal device is in the group, and the at least one terminal device identifier includes an identifier of the first terminal device; the type of the to-be-measured reference signal is used to indicate a type of the reference signal; the measurement window configuration is used to indicate a measurement time interval; the measurement configuration parameter is used to determine a quantity of measurement results that need to be reported and types of the measurement results; and the reference signal identifier is used to determine, in a plurality of reference signals sent by the first terminal device, the reference signal that needs to be measured by the first terminal.

In this application, the measurement configuration information sent by the third terminal device not only includes the identifier of the first terminal device and a time-frequency resource available to the first terminal device, but also includes identifiers of other terminal devices in the group to which the first terminal device belongs and a corresponding time-frequency resource. In this way, after completing synchronous access, the second terminal device can obtain, based on the measurement configuration information sent by the third terminal device, time-frequency resource positions of reference signals of the other terminal devices in the group to which the first terminal device belongs, and further can measure, with no need to access each of the other terminal devices in the group, quality of communication with the other terminal devices in the group, thereby saving communication resources, and helping the second terminal device obtain better communication experience.

In an embodiment, the method may further include: The second terminal device obtains a sidelink synchronization signal SLSS from the first terminal device, performs a synchronization operation based on the SLSS, and sends feedback information to the first terminal device, where the feedback information is used to notify the first terminal device that the second terminal device has performed a synchronization operation.

In an embodiment, an implementation solution in which the second terminal device completes the synchronization operation is provided, thereby improving integrity of this solution.

According to a sixth aspect, an embodiment of the application provides a terminal device, where the terminal device is a first terminal device, and the first terminal device includes: an obtaining unit, a sending unit, and a receiving unit. The obtaining unit is configured to obtain measurement configuration information. The sending unit is configured to send the measurement configuration information to a second terminal device, where the measurement configuration information is used to indicate the second terminal device to measure, based on the measurement configuration information, a reference signal received by the second terminal device from the first terminal device, to obtain a measurement result of the reference signal. The sending unit is further configured to send the reference signal to the second terminal device. The receiving unit is configured to receive the measurement result that is of the reference signal and that is sent by the second terminal device.

The composition modules of the first terminal device may further perform the operations described in the first aspect and embodiments thereof. For details, refer to the descriptions in the first aspect and embodiments thereof.

According to a seventh aspect, an embodiment of the application provides a terminal device, where the terminal device is a first terminal device, and the first terminal device includes: a sending unit, configured to send indication information to a third terminal device, where the indication information is used to indicate the third terminal device to send measurement configuration information to a second terminal device. The sending unit is further configured to send a reference signal to the second terminal device, where the measurement configuration information is used by the second terminal device to measure, based on the measurement configuration information, the reference signal received by the second terminal device from the first terminal device, to obtain a measurement result of the reference signal. The third terminal device and the first terminal device are in a same group, and the third terminal device is configured to allocate time-frequency resources to a plurality of terminals in the group.

The composition modules of the first terminal device may further perform the operations described in the second aspect and embodiments thereof. For details, refer to the descriptions in the second aspect and embodiments thereof.

According to an eighth aspect, an embodiment of the application provides a terminal device, where the terminal device is a third terminal device, and the third terminal device includes: a receiving unit and a sending unit. The receiving unit is configured to receive indication information from a first terminal device, where the indication information is used to indicate the third terminal device to send measurement configuration information to a second terminal device. The sending unit is configured to send the measurement configuration information to the second terminal device, where the measurement configuration information is used to indicate the second terminal device to measure, based on the measurement configuration information, a reference signal received by the second terminal device from the first terminal device, to obtain a measurement result of the reference signal. The receiving unit is further configured to receive the measurement result that is of the reference signal and that is sent by the second terminal device. The third terminal device and the first terminal device are in a same group, and the third terminal device is configured to allocate time-frequency resources to a plurality of terminals in the group.

The composition modules of the third terminal device may further perform the operations described in the third aspect and embodiments thereof. For details, refer to the descriptions in the third aspect and embodiments thereof.

According to a ninth aspect, an embodiment of the application provides a terminal device, where the terminal device is a second terminal device, and the terminal device includes: a receiving unit, a determining unit, and a sending unit. The receiving unit is configured to receive measurement configuration information from a first terminal device, where the measurement configuration information is used to indicate the second terminal device to measure, based on the measurement configuration information, a reference signal received by the second terminal device from the first terminal device. The receiving unit is further configured to receive the reference signal from the first terminal device. The determining unit is configured to determine a measurement result of the reference signal based on the measurement configuration information and the reference signal. The sending unit is configured to send the measurement result of the reference signal to the first terminal device.

The composition modules of the second terminal device may further perform the operations described in the fourth aspect and embodiments thereof. For details, refer to the descriptions in the fourth aspect and embodiments thereof.

According to a tenth aspect, an embodiment of the application provides a terminal device, where the terminal device is a second terminal device, and the terminal device includes: a receiving unit, a determining unit, and a sending unit. The receiving unit is configured to receive measurement configuration information from a third terminal device, where the measurement configuration information is used to indicate the second terminal device to measure, based on the measurement configuration information, a reference signal received by the second terminal device from a first terminal device. The receiving unit is further configured to receive the reference signal from the first terminal device. The determining unit is configured to determine a measurement result of the reference signal based on the measurement configuration information and the reference signal. The sending unit is configured to send the measurement result of the reference signal to the third terminal device. The third terminal device and the first terminal device are in a same group, and the third terminal device is configured to allocate time-frequency resources to a plurality of terminals in the group.

The composition modules of the second terminal device may further perform the operations described in the fifth aspect and embodiments thereof. For details, refer to the descriptions in the fifth aspect and embodiments thereof.

According to an eleventh aspect, an embodiment of the application provides a communications apparatus. The communications apparatus may be any one of the first terminal device, the second terminal device, or the third terminal device described above. The communications apparatus includes at least one processor and at least one memory. The at least one memory is configured to store instructions. The at least one processor is configured to execute the instructions in the at least one memory, so that the communications apparatus performs the method according to any one of the first aspect to the fifth aspect.

According to a twelfth aspect, an embodiment of the application provides a computer-readable storage medium. The computer-readable storage medium stores instructions. When the instructions are run on a computer, the computer is enabled to perform the method according to any one of the foregoing aspects.

According to a thirteenth aspect, an embodiment of the application provides a computer program product including instructions. When the computer program product runs on a computer, the computer is enabled to perform the method according to any one of the foregoing aspects.

For beneficial effects of the sixth aspect to the thirteenth aspect of the application, refer to the first aspect.

DESCRIPTION OF EMBODIMENTS

Embodiments of this application provide an information processing method and a terminal device. A second terminal device measures, based on obtained measurement configuration information, a reference signal sent by a first terminal device. Therefore, a measurement result reflects quality of a time-frequency resource used when the first terminal communicates with the second terminal. In this way, a reference signal measurement method applicable to a sidelink is provided.

The following describes the embodiments of this application with reference to the accompanying drawings.

In the specification, claims, and the accompanying drawings of this application, the terms "first", "second", and the like are intended to distinguish similar objects but do not necessarily indicate an order or sequence. It should be understood that the terms used in such a way are interchangeable in a proper circumstance, which is merely a discrimination manner that is used when objects having a same attribute are described in the embodiments of this application. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, system, product, or device.

A technology described in this application is applicable to a subsequent evolved system of a long term evolution (LTE) system, for example, a 5G system including a new radio (NR) system, an evolved LTE system, or the like, or other wireless communications systems that use various radio access technologies, for example, a system that uses an access technology such as code division multiple access, frequency division multiple access, time division multiple access, orthogonal frequency division multiple access, or single-carrier frequency division multiple access. It should be understood that in the embodiments of this application, an example in which the reference signal measurement method is applied to the 5G system is merely used for description.

D2D communication may be implemented in the 5G system. D2D is a technology in which terminal devices directly communicate with each other. The communication between terminal devices is performed on a sidelink, without a need of forwarding by a base station. For example, the method is applicable to vehicle to everything (V2X) wireless communication, is applicable to wireless communication in an information system including household appliances, or is applicable to a wireless communications system including terminal devices of other types.

Figure 1A:
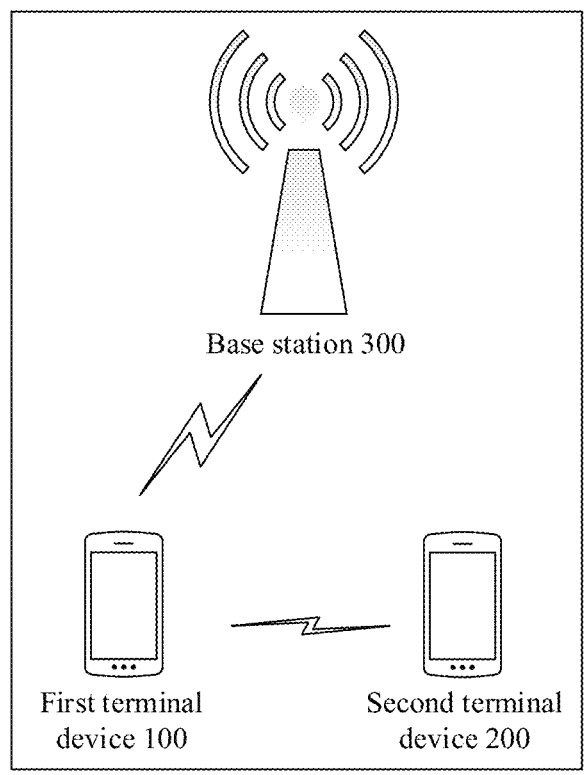
FIG. 1a is a schematic diagram of a network system for D2D communication according to an embodiment of this application.
Figure 1B:
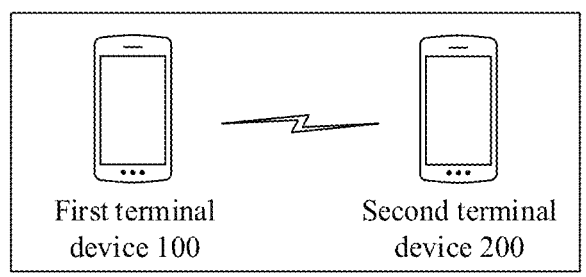
FIG. 1b is a schematic diagram of another network system for D2D communication according to an embodiment of this application.
Figure 1C:
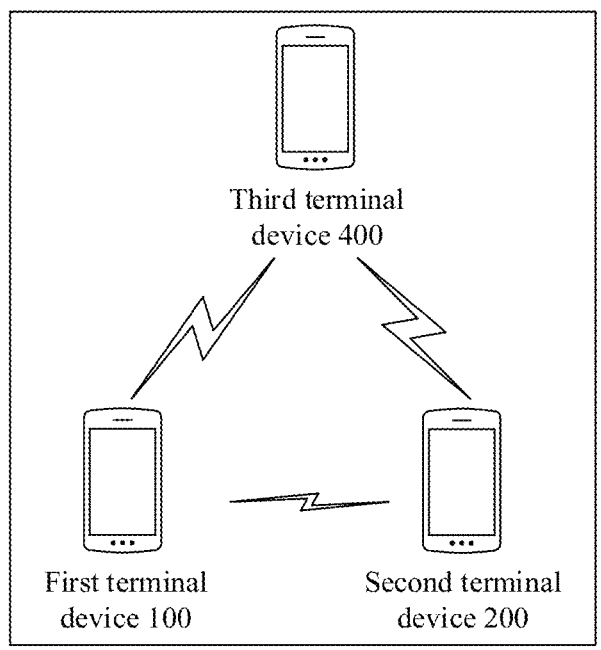
FIG. 1c is a schematic diagram of still another network system for D2D communication according to an embodiment of this application.

The D2D communication may further include three working modes, and FIG. 1a, FIG. 1b, and FIG. 1c are respectively three schematic structural diagrams of a network system in the foregoing three working modes in the reference signal measurement method provided in the embodiments of this application. For example, in a first working mode, referring to FIG. 1a, a base station 300 allocates a time-frequency resource in a resource pool to each D2D terminal device, to transmit information between D2D. In a second working mode, referring to FIG. 1b, in a D2D unicast scenario, a terminal device that performs communication autonomously selects a time-frequency resource from a resource pool, to transmit information between D2D. In a third working mode, referring to FIG. 1c, in a D2D multicast scenario, a third terminal device 400 allocates a time-frequency resource in a resource pool to each D2D terminal device, to transmit information between D2D. In the embodiments of this application, a first terminal device 100, a second terminal device 200, and the third terminal device 400 are various terminal devices or apparatuses having a wireless communication function, for example, vehicles, vehicle-mounted devices, vehicle-mounted modules or units, drive test infrastructure devices, handheld devices, wearable devices, computing devices, other processing devices connected to a wireless modem, or various forms of user equipment (UE) such as vehicle user equipment (VUE) or air-conditioned user equipment.

In the embodiments of this application, base stations may include various forms of macro base stations, micro base stations, relay stations, access points, roadside units, and the like. Certainly, functions of the base station in this application may also be implemented by using a built-in module or unit, and the built-in module or unit is disposed in the macro base station, micro base station, relay station, access point, and the roadside unit. In systems using different radio access technologies, a device having a base station function may have different names. For example, the device is referred to as an evolved NodeB (eNB) in an LTE system, is referred to as a gNB in an NR system, and is referred to as a NodeB in a 3rd-generation 3G system.

In an embodiment, the reference signal measurement method provided in the embodiments of this application is applicable to a V2X technology. In V2X, a vehicle is connected to all things by using a next-generation information communications technology, to implement vehicle to vehicle (vehicle to vehicle, V2V), vehicle to infrastructure (V2I), vehicle to pedestrian (V2P), and vehicle to network (V2N) all-round connection and information exchange. For example, vehicles travel in a queue. Several vehicles form a vehicle platoon, and a vehicle at the head of the vehicle platoon controls the entire vehicle platoon, for example, controls a speed of the entire vehicle platoon, a vehicle spacing, whether another vehicle is allowed to join the vehicle platoon, and whether a vehicle in the vehicle platoon is allowed to leave the vehicle platoon. The vehicle at the head of the vehicle platoon may need to send a message to the other vehicles in the vehicle platoon in a broadcast or multicast manner, or the vehicle at the head of the vehicle platoon may need to perform unicast communication with the other vehicles in the vehicle platoon, and the other vehicles in the vehicle platoon may also perform unicast communication with each other. Therefore, to ensure transmission quality in unicast communication, quality of communication between vehicles needs to be measured based on a reference signal.

In an embodiment, the reference signal measurement method provided in the embodiments of this application may also be applied to a home appliance networking system. For example, household appliances form an information exchange system. For example, the household appliances include an air conditioner, a washing machine, an electric light, a refrigerator, and an electric cooker. A control center controls each electric appliance, for example, controls an on/off time of each electric appliance, controls temperature set on the air conditioner, controls a cleaning mode of the washing machine, controls whether a new electric appliance is allowed to be added, and controls whether an old electric appliance is allowed to be eliminated. The control center may need to send a message to each electric appliance in a broadcast or multicast manner, or the control center may need to perform unicast communication with one of the electric appliances, and the electric appliances may also perform unicast communication with each other. Therefore, to ensure transmission quality in unicast communication, quality of communication between the control center and the electric appliances and quality of communication between the electric appliances need to be measured based on a reference signal.

It should be understood that the reference signal measurement method provided in the embodiments of this application may be further applied to another D2D communication environment. In this embodiment and subsequent embodiments, only an example in which the first terminal device, the second terminal device, and the third terminal device are all VUE is used for detailed description.

An embodiment of this application provides a reference signal measurement method. The method may be applied to a VUE side in D2D communication. First VUE 100 sends a reference signal to second VUE 200, and the second VUE 200 obtains a measurement result of the reference signal of the second VUE 200 based on obtained measurement configuration information, so that the obtained measurement result reflects quality of communication between the first VUE 100 and the second VUE 200.

In an embodiment, the first VUE may send the measurement configuration information to the second VUE after obtaining the measurement configuration information. For example, in the first working mode, in other words, when a base station allocates a time-frequency resource, the measurement configuration information obtained by the first VUE is sent by the base station. In the second working mode, in other words, when VUE autonomously selects a time-frequency resource, the measurement configuration information obtained by the first VUE is generated by the first VUE.

In an embodiment, the measurement configuration information may alternatively be sent by third VUE to the second VUE. For example, in the third working mode, in other words, when third VUE allocates a time-frequency resource, after generating the measurement configuration information, the third VUE sends the measurement configuration information to the second VUE.

Because processing manners of the VUE that are implemented in the foregoing three working modes are different, the following separately describes the reference signal measurement method in the foregoing three working modes in detail.

1. A Base Station Allocates a Time-Frequency Resource.

Figure 2:
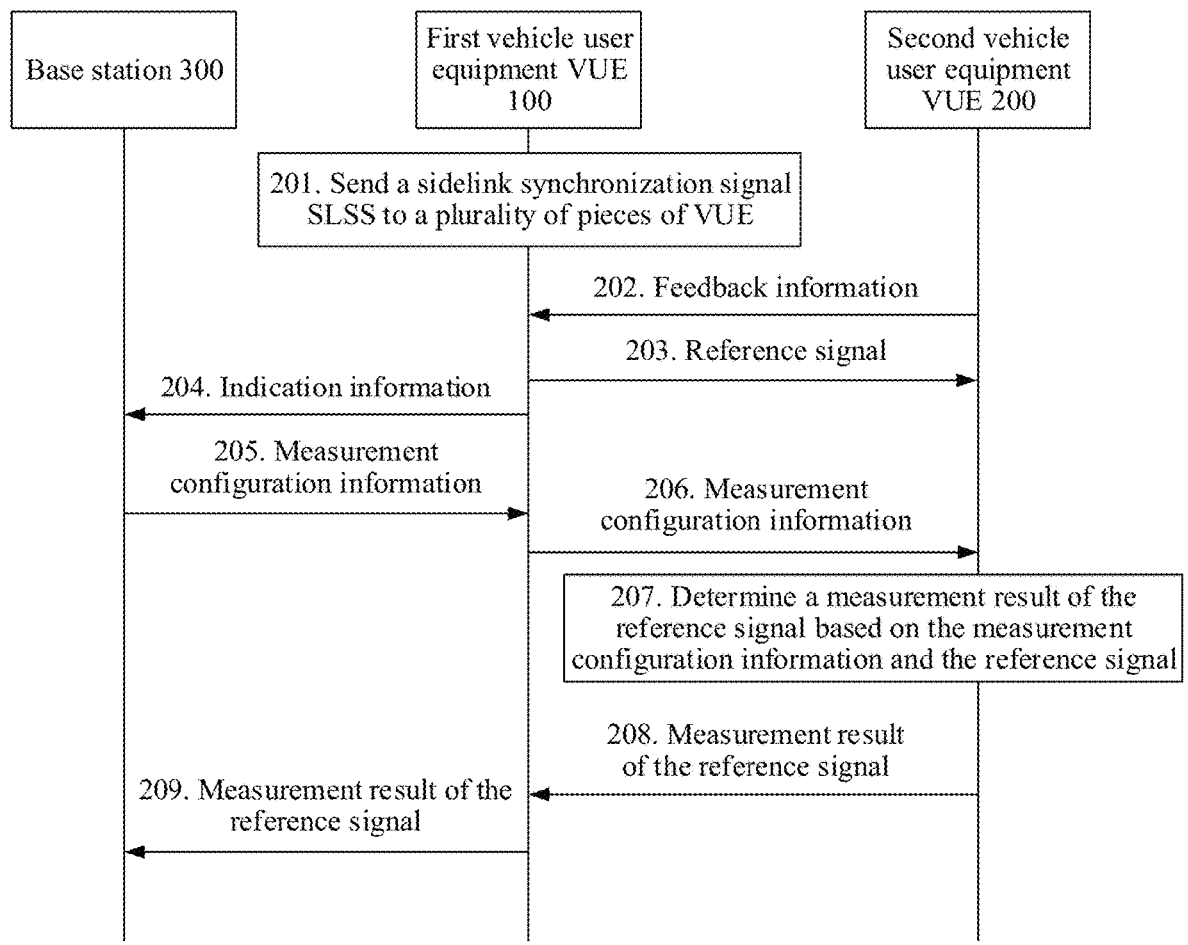
FIG. 2 is a schematic flowchart of a reference signal measurement method according to an embodiment of this application.

For example, referring to FIG. 2, in the embodiments of this application, an embodiment of the reference signal measurement method may include the following operations.

201. First VUE sends a sidelink synchronization signal to a plurality of pieces of VUE.

In an embodiment of the application, the sidelink synchronization signal (SLSS) is a synchronization signal directly sent by VUE to another piece of VUE in D2D communication, and is used by the VUE that receives the SLSS to perform a synchronization operation based on the SLSS.

In an embodiment of the application, the first VUE may send the SLSS to a plurality of pieces of VUE in a cell in which the first VUE is located, or may send the SLSS to a plurality of pieces of VUE in a group.

For example, the first VUE may send the sidelink synchronization signal to the plurality of pieces of VUE in the group or in the cell in a broadcast manner, may send the SLSS to the plurality of pieces of VUE in the group in a multicast manner, or may send the SLSS to the plurality of pieces of VUE in another manner. This is not specifically limited herein.

In an embodiment of the application, the first VUE is a device that needs to establish a communication connection to second VUE, and may be any VUE in the group. When the first VUE sends the SLSS to the plurality of pieces of VUE in the cell, the plurality of pieces of VUE in the cell include the second VUE. When the first VUE sends the SLSS to the plurality of pieces of VUE in the group, the plurality of pieces of VUE in the group include the second VUE.

In an embodiment of the application, the cell is an area that can be covered by a radio signal transmitted by the base station.

In an embodiment of the application, the plurality of pieces of VUE included in the group may be all VUE in a cell in which the second VUE is located. For example, all vehicles in a same cell form one group, and a vehicle at the head of the vehicle platoon is used as third VUE. Alternatively, the plurality of pieces of VUE included in the group may be some VUE in a cell in which the second VUE is located. For example, a same cell includes two vehicle platoons arranged in parallel, and each vehicle platoon may form one group. It should be understood that a plurality of terminals included in one group need to be flexibly selected based on an actual situation. This is not limited herein.

In an embodiment of the application, the first VUE may send the SLSS to the plurality of pieces of VUE at regular intervals, may continuously send the SLSS to the plurality of pieces of VUE, may send the SLSS to the plurality of pieces of VUE at a fixed time point, or may send the SLSS to the plurality of pieces of VUE in another manner. This is not specifically limited herein.

202. The first VUE receives feedback information sent by the second VUE.

In an embodiment of the application, because the first VUE is any VUE in the group, correspondingly, the second VUE may blindly detect SLSSs sent by a plurality of pieces of VUE, perform the synchronization operation based on the SLSS sent by one (that is, the first VUE) of the plurality of pieces of VUE, and send the feedback information to the first VUE. Therefore, the first VUE receives the feedback information sent by the second VUE. The feedback information is used by the first VUE to determine that the second VUE has performed the synchronization operation based on the SLSS.

In an embodiment of the application, the second VUE may send the feedback information to any one of the plurality of pieces of VUE, may send the feedback information to a transmit end (that is, the first VUE) of an SLSS that is first detected, or may send the feedback information to the first VUE that needs to perform data exchange. A manner of determining the first VUE is not limited herein.

203. The first VUE sends a reference signal to the second VUE.

In some embodiments of this application, the reference signal sent by the first VUE to the second VUE is a sidelink reference signal, and is used to perform sidelink channel estimation or channel measurement, and a measurement result is sent to the base station as a reference for the base station to allocate a time-frequency resource. The reference signal may be an SLSS, may be a channel state information reference signal (CSI-RS), or may be another type of reference signal. This is not specifically limited herein.

In an embodiment of the application, the first VUE may send a same reference signal by using a plurality of beams, and reference signals sent by different beams have different reference signal identifiers. Therefore, the first VUE may send, at a same time-frequency position, a plurality of reference signals that carry different reference signal identifiers.

In an embodiment, operation 203 needs to be performed after operation 202. For example, after receiving the feedback information sent by the second VUE, the first VUE sends the reference signal to the second VUE based on the feedback information. Therefore, the second VUE may obtain, at a position of a time-frequency resource allocated by the base station to the first VUE, the reference signal sent by the second VUE.

In some embodiments of this application, after receiving the feedback information of the second VUE, the first VUE learns that the second VUE has performed the synchronization operation based on the SLSS, and then sends the reference signal to the second VUE. This avoids a waste of communication resources caused because the second VUE cannot process the received reference signal.

In another embodiment, a sequence of performing operation 203 and performing operation 201 and operation 202 may not be limited. Operation 203 may be performed before operation 201 and operation 202, or may be performed after operation 201 and operation 202. For example, the first VUE may send the reference signal to the plurality of pieces of VUE in the group, the plurality of pieces of VUE in the group include the second VUE. Alternatively, the first VUE may send the reference signal to the plurality of pieces of VUE in the cell, where the plurality of pieces of VUE in the cell include the second VUE.

In some embodiments of this application, the first VUE may send the reference signal to the plurality of pieces of VUE in the group or in the cell in a broadcast manner, may send the reference signal to the plurality of pieces of VUE in the group in a multicast manner, or may send the reference signal to the plurality of pieces of VUE in the group or in the cell in another manner. This is not specifically limited herein.

In some embodiments of this application, the first VUE may send the reference signal to the plurality of pieces of VUE at regular intervals, may send the reference signal when intending to communicate with any one of the plurality of pieces of VUE, may continuously send the reference signal to the plurality of pieces of VUE, may send the reference signal to the plurality of pieces of VUE in the group at a fixed time point, or may send the reference signal to the plurality of pieces of VUE in the group in another manner. This is not specifically limited herein.

In some embodiments of this application, alternatively, the first VUE may actively send the reference signal without receiving a feedback. Because the first VUE is any one of the plurality of pieces of VUE in the group or in the cell, after accessing a piece of first VUE and obtaining measurement configuration information, the second VUE can obtain, with no need to access other pieces of first VUE in the group or in the cell, reference signals of the other pieces of first VUE at positions of time-frequency resources allocated by the base station to the other pieces of first VUE, and measure the reference signals, thereby saving communication resources.

204. The first VUE sends indication information to the base station.

In some embodiments of this application, after receiving the feedback information sent by the second VUE, the first VUE may learn that the second VUE has performed the synchronization operation based on the SLSS. In addition, because the second VUE sends the feedback information, the first VUE may learn that the second VUE needs to communicate with another piece of VUE, that is, the base station needs to allocate a time-frequency resource to the second VUE. Therefore, the first VUE may send the indication information to the base station, and the indication information is used to indicate the base station to send the measurement configuration information to the first VUE.

205. The first VUE receives the measurement configuration information sent by the base station.

In some embodiments of this application, the measurement configuration information includes a time-frequency resource list, a VUE list, a type of a to-be-measured reference signal, a measurement window configuration, a measurement configuration parameter, and a reference signal identifier.

The time-frequency resource list is used to indicate a position of a to-be-measured time-frequency resource.

The VUE list includes at least one terminal device identifier that corresponds one-to-one to at least one piece of VUE, and the at least one terminal device identifier includes an identifier of the first VUE.

The type of the to-be-measured reference signal is used to indicate a type of the reference signal.

The measurement window configuration is used to indicate a measurement time interval.

The measurement configuration parameter is used to determine a quantity of measurement results that need to be reported and types of the measurement results.

The reference signal identifier is used to determine, in a plurality of reference signals sent by the first VUE, the reference signal that needs to be measured by the second VUE.

In some embodiments of this application, because the base station is responsible for allocating time-frequency resources to the plurality of pieces of VUE including the first VUE and the second VUE, time-frequency resources included in the time-frequency resource list are determined by the base station.

For example, the base station may add all unallocated time-frequency resources in the resource pool of the cell in which the second VUE is located to the time-frequency resource list. Alternatively, the base station may add some unallocated time-frequency resources in the resource pool of the cell in which the second VUE is located to the time-frequency resource list based on time-frequency resource usage of the plurality of pieces of VUE. Alternatively, the base station may determine, based on historical time-frequency resource usage of the first VUE, time-frequency resources included in the time-frequency resource list. A time-frequency resource is flexibly selected by the base station based on an actual situation, and is not limited herein.

In an embodiment of the application, the resource pool is a time-frequency resource set including consecutive or inconsecutive time-frequency resources, and is used for information transmission between D2D. The time-frequency resource is defined in two dimensions of time and frequency. A granularity in the time dimension may be a subframe, a slot, an orthogonal frequency division multiplexing symbol (OFDM symbol, orthogonal frequency division multiplexing symbol), or the like. A granularity in the frequency dimension may be a resource block, a subcarrier, another type of granularity, or the like. A granularity in the time dimension or the frequency dimension is not limited herein.

In some embodiments of this application, the VUE list included in the measurement configuration information sent by the base station includes the at least one terminal device identifier, and the at least one terminal device identifier may be the identifier of the first VUE, may be the identifier of the first VUE and identifiers of a plurality of pieces of VUE adjacent to the first VUE, may be identifiers of all VUE in the group to which the first VUE belongs, may be identifiers of all VUE in the cell in which the second VUE is located, or the like. VUE identifiers included in the VUE list are determined by the base station. This is not limited herein.

In an embodiment of the application, the VUE identifier may be a cell radio network temporary identifier (C_RNTI), may be a sidelink identifier (sidelink ID), may be a group identifier of a group to which VUE belongs and an identifier of the VUE in the group, or may be another type of terminal device identifier. This is not specifically limited herein.

In some embodiments of this application, because different pieces of VUE may use different time-frequency resources, the measurement configuration information may further include a correspondence between a terminal device identifier and a time-frequency resource in the time-frequency resource list. In other words, each terminal device identifier corresponds to one time-frequency resource or at least two time-frequency resources. For example, the VUE list includes a vehicle 1, a vehicle 2, a vehicle 3, and a vehicle 4, and the time-frequency resource list includes a time-frequency resource 1, a time-frequency resource 2, a time-frequency resource 3, a time-frequency resource 4, a time-frequency resource 5, a time-frequency resource 6, and a time-frequency resource 7, a time-frequency resource 8, and a time-frequency resource 9, where time-frequency resources available to the vehicle 1 are the time-frequency resource 1, the time-frequency resource 2, and the time-frequency resource 3, and time-frequency resources available to the vehicle 2 are the time-frequency resource 4 and the time-frequency resource 5, a time-frequency resource available to the vehicle 3 is the time-frequency resource 6, and time-frequency resources available to the vehicle 4 are the time-frequency resource 7, the time-frequency resource 8, and the time-frequency resource 9. It should be understood that the example herein is merely for ease of understanding of this solution, and imposes no specific limitation.

In some embodiments of this application, the measurement configuration information sent by the base station not only includes the identifier of the first VUE and a time-frequency resource available to the first VUE, but also includes identifiers of other pieces of VUE in the group or in the cell to which the second VUE belongs and corresponding time-frequency resources. Therefore, after completing synchronous access, the second VUE may obtain time-frequency resource positions of reference signals of the other pieces of VUE based on the measurement configuration information sent by the base station, and further, can measure quality of communication with the other pieces of VUE in the group or in the cell, with no need to perform access with the other pieces of VUE in the group or in the cell one by one, thereby saving communication resources. In addition, if the second communications device finds, based on the measurement result, that quality of communication with another piece of VUE in the VUE list is better, the second communications device may communicate with the VUE with the better communication quality. This helps the second VUE obtain better communication experience.

In an embodiment of the application, the type of the reference signal may be an SLSS, a CSI-RS, another type of reference signal, or the like. This is not specifically limited herein.

In an embodiment of the application, the measurement window configuration (signal measurement time configuration, SMTC) mainly includes a measurement period, to indicate a time interval for performing measurement.

In an embodiment of the application, the type of the measurement result may be understood as a format type of the measurement result. Because there are different reference signal measurement algorithms, after receiving a same reference signal, the second VUE may obtain different types of measurement results by using different measurement algorithms. For example, the type of the test result may be reference signal received power (RSRP), channel quality information (CQI), a precoding matrix indicator (PMI), or a measurement result of another format type. This is not specifically limited herein.

In some embodiments of this application, the quantity of measurement results may include an amount of VUE and a quantity of beams of each VUE. The quantity of measurement results may be an upper limit of the quantity of measurement results reported by the second VUE, so that the second VUE can flexibly determine the reporting quantity based on an actual situation with reference to the upper limit of the quantity.

When the VUE list includes identifiers of a plurality of pieces of VUE, the second VUE may obtain a time-frequency resource available to each VUE based on a correspondence between a terminal device identifier and a time-frequency resource, further determine a position of a reference signal of each VUE, and measure quality of communication with the plurality of pieces of VUE with reference to the received measurement configuration information. In other words, the second VUE may select, from a plurality of pieces of VUE corresponding to the VUE list according to a requirement, VUE that the second VUE intends to measure. The amount of VUE included in the quantity of measurement results is an amount of VUE that can be reported after the second VUE measures the VUE that the second VUE intends to measure. For example, the vehicle platoon is a running vehicle platoon, the first VUE is the vehicle 1, the second VUE is the vehicle 5, and the vehicle 5 intends to know a moving speed of the vehicle platoon. The amount of VUE included in the quantity of measurement results is 3, and the quantity is an upper limit of an amount of VUE that can be reported by the second VUE. The VUE list includes an identifier of the vehicle 1, an identifier of the vehicle 2, an identifier of the vehicle 3, and an identifier of the vehicle 4. The vehicle 1, the vehicle 2, the vehicle 3, and the vehicle 4 all know the moving speed of the vehicle platoon. In this case, the vehicle 2 may separately measure quality of communication between the vehicle 1, the vehicle 2, the vehicle 3, and the vehicle 4. Because the amount of VUE is 3, the second VUE can select measurement results of only three vehicles from the four vehicles for reporting. It should be understood that the example herein is merely for ease of understanding. A setting of the foregoing measurement indicator value is not limited herein.

Because a transmit end of a reference signal may send the reference signal by using a plurality of beams at a same time, when both VUE and a time-frequency resource position are determined, different measurement results may be obtained based on different beams for a same reference signal. Therefore, the quantity of measurement results further includes a limitation on a quantity of beams of each VUE. For example, a quantity of beams of each terminal is 3. The quantity is an upper limit of a quantity of beams that can be reported, and the vehicle 1 sends a same reference signal by using eight beams at a same time-frequency resource position. In this case, for the same reference signal sent by the vehicle 1 at the same time-frequency resource position, the second VUE may obtain eight measurement results through measurement. In this case, the second VUE may select three of the eight measurement results for reporting. It should be understood that this is merely an example, and is not specifically limited herein.

In an embodiment of the application, the reference signal identifier may be used to determine a beam corresponding to a reference signal, and may be a channel state information reference signal resource index (CRI), a synchronization signal block time index (SSB time index), or another type of reference signal identifier. This is not specifically limited herein.

In some embodiments of this application, the reference signal identifier included in the measurement configuration information sent by the base station may include only an identifier of the reference signal sent by the first VUE to the second VUE, or may include identifiers of reference signals sent by other pieces of VUE in the VUE list and a correspondence between a reference signal identifier and a terminal device identifier. Reference signal identifiers that are included are determined by the base station, and are not limited herein.

In an embodiment of the application, the first VUE may send a same reference signal by using a plurality of beams, reference signal identifiers of reference signals sent by using different beams are different, and there is a correspondence between a reference signal identifier and a beam. In this case, the base station may perform the following operations based on beam allocation of the first VUE: If the measurement configuration information carries one or at least two reference signal identifiers of the first VUE, when measuring the first VUE, the second VUE may select, from reference signals sent by the first VUE by using a plurality of beams, a beam corresponding to the reference signal identifier for measurement. This prevents measurement of all beams sent by the first VUE, reduces a measurement time of the second VUE, and improves reference signal measurement efficiency.

In some embodiments of this application, the VUE list in the measurement configuration information sent by the base station includes at least one terminal device identifier, and the at least one terminal device identifier may include a plurality of terminal device identifiers. In this case, the base station may configure the plurality of terminal device identifiers by using one public measurement configuration message, in other words, a VUE list in one measurement configuration message may include all of the plurality of terminal device identifiers. Alternatively, the base station may configure the plurality of terminal device identifiers by using a plurality of measurement configuration messages. For example, a VUE list in each measurement configuration message may include one terminal device identifier, or may include some of the plurality of terminal device identifiers.

206. The first VUE sends the measurement configuration information to the second VUE.

207. The second VUE determines the measurement result of the reference signal based on the measurement configuration information and the reference signal.

In some embodiments of this application, after obtaining the measurement configuration information, the second VUE may determine to-be-measured VUE, a position of a corresponding time-frequency resource, a type of a to-be-measured reference signal, a measurement time interval, a reporting type of a measurement result, and a quantity of reported measurement results. After obtaining the position of the reference signal based on the correspondence between a terminal device identifier and a time-frequency resource and the position of the time-frequency resource, the second VUE may measure the reference signal at the position of the reference signal at the indicated time interval, and determine, according to requirements on a reporting type and a measurement result reporting quantity, a measurement result that is of the reference signal and that needs to be reported.

In an embodiment of the application, one measurement result reflects only communication quality of a reference signal sent by one piece of VUE at one time-frequency resource position by using a determined beam. For example, a measurement result of one reference signal may carry any combination of a reference signal identifier, a time-frequency resource position of the reference signal, or a terminal device identifier of a transmit end of the reference signal.

The second VUE may not only measure the reference signal sent by the first VUE, but also measure, based on the measurement configuration information sent by the base station, reference signals sent by other pieces of VUE in the VUE list. Therefore, there may be a mapping relationship between the measurement result, generated by the second VUE, of the reference signal and the measured VUE, and each VUE corresponds to a plurality of measurement results. For example, the first VUE is a vehicle 1, the second VUE is a vehicle 4, and the vehicle 4 intends to know a moving speed of the vehicle platoon. The VUE list includes an identifier of the vehicle 1, an identifier of a vehicle 2, and an identifier of a vehicle 3, the vehicle 1, the vehicle 2, and the vehicle 3 all know the moving speed of the vehicle platoon, the quantity of VUE in the measurement result in the measurement configuration information is 3, and the quantity of beams of each terminal is 5. The vehicle 2 separately measures quality of communication between the vehicle 1, the vehicle 2, and the vehicle 3. Time-frequency resources available to the vehicle 1 are a time-frequency resource 1 and a time-frequency resource 2, and the vehicle 1 sends a reference signal to the second VUE by using two beams. A time-frequency resource available to the vehicle 2 is a time-frequency resource 4, and the vehicle 2 sends a reference signal at a position of the time-frequency resource 4 by using eight beams. A time-frequency resource available to the vehicle 3 is a time-frequency resource 6, and the vehicle 3 sends a reference signal at a position of the time-frequency resource 6 by using four beams. In this case, the vehicle 4 may obtain four measurement results of the vehicle 1 and send all the four measurement results to the second VUE, may obtain eight measurement results of the vehicle 2 and send selected five measurement results to the second VUE, and may further obtain four measurement results of the vehicle 3 and send all the four measurement results to the second VUE. It should be understood that, the examples herein are merely for ease of understanding of this solution. Indicators of parameters in measurement configuration information should be flexibly set according to an actual situation, and are not limited herein.

208. The second VUE sends the measurement result of the reference signal to the first VUE.

In some embodiments of this application, after determining the measurement result that is of the reference signal and that needs to be reported, the second VUE may send the measurement result to the first VUE.

209. The first VUE sends the measurement result of the reference signal to the base station.

In some embodiments of this application, after receiving the measurement result that is of the reference signal and that is sent by the first VUE, the second VUE may send the measurement result to the base station, so that the base station allocates a time-frequency resource to the second VUE based on the measurement result.

In some embodiments of this application, the first VUE receives the measurement configuration information sent by the base station, and forwards the measurement configuration information to the second VUE. The first VUE receives the measurement result sent by the second VUE, and sends the measurement result to the base station. In this case, the second VUE can obtain, without communicating with the base station, the time-frequency resource allocated by the base station. Therefore, even if the second VUE does not access the cell, the second VUE can obtain the time-frequency resource allocated by the base station, and use the time-frequency resource to perform D2D communication, thereby extending an application scenario of the reference signal measurement method, and improving integrity of this solution.

2. VUE Autonomously Selects a Time-Frequency Resource.

In the embodiments, the VUE independently selects, from a resource pool, a time-frequency resource used for D2D communication. A plurality of pieces of VUE that perform D2D communication include VUE that has not established a connection and VUE that has established a connection. In the two cases, the measurement configuration information sent by the first VUE to the second VUE is different. The following separately describes the two cases in which a connection has not been established and a connection has been established.

A. No Connection has been Established Between VUEs.

Figure 3:
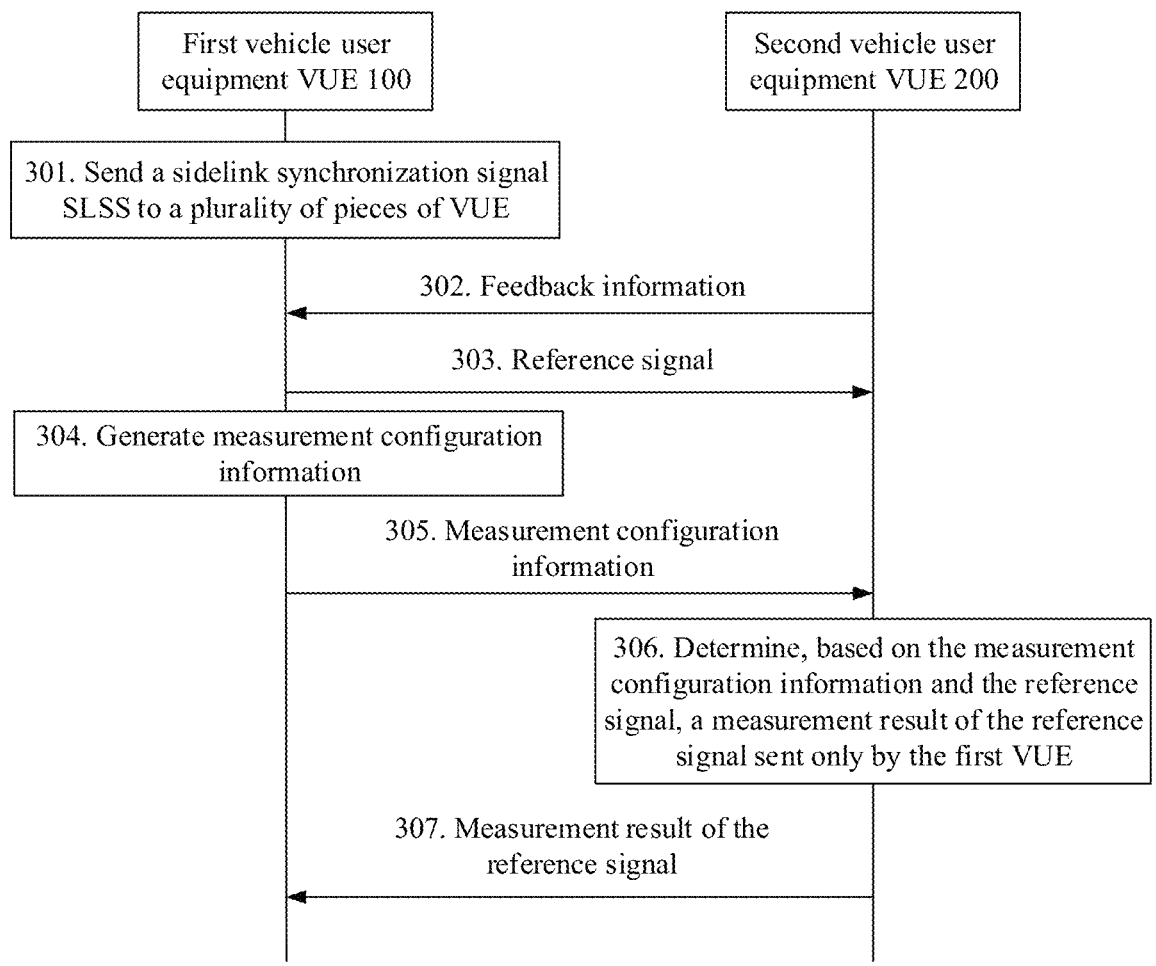
FIG. 3 is another schematic flowchart of a reference signal measurement method according to an embodiment of this application.

For example, referring to FIG. 3, in the embodiments of this application, another embodiment of the reference signal measurement method may include the following operations.

In an embodiment of the application, operations 301 to 303 are similar to operations 201 to 203 in the foregoing embodiment in FIG. 2. Details are not described herein again.

304. The first VUE generates measurement configuration information.

In some embodiments of this application, because VUE performing D2D communication may autonomously select, from the resource pool, a time-frequency resource used for the communication, the first VUE may generate the measurement configuration information.

In some embodiments of this application, the measurement configuration information includes a terminal device identifier, a type of a to-be-measured reference signal, a measurement window configuration, a measurement configuration parameter, and a reference signal identifier.

The terminal device identifier is an identifier of the first VUE.

The type of the to-be-measured reference signal is used to indicate a type of the reference signal.

The measurement window configuration is used to indicate a measurement time interval.

The measurement configuration parameter is used to determine a quantity of measurement results that need to be reported and types of the measurement results.

The reference signal identifier is an identifier of the reference signal sent by the first VUE to the second VUE.

In some embodiments of this application, because no connection has been established between VUEs that perform D2D communication, the terminal device identifier in the measurement configuration information includes only the identifier of the first VUE.

In some embodiments of this application, because the first VUE may send the reference signal by using a plurality of beams, the quantity of measurement results may include a quantity of beams of the VUE, and the quantity of beams may be an upper limit of a quantity of beams reported by the second VUE. Therefore, the second VUE may flexibly determine the reporting quantity based on an actual situation with reference to the upper limit of the quantity.

In some embodiments of this application, the reference signal identifier includes only the identifier of the reference signal sent by the first VUE to the second VUE. In this case, the second VUE may obtain, from a plurality of reference signals sent by the first VUE, the reference signal that needs to be measured by the second VUE. Because the first VUE allocates some beams to communicate with VUE other than the second VUE, the first VUE may add the identifier of the reference signal to the measurement configuration information based on beam allocation of the first VUE, to prevent the second VUE from measuring all beams. This reduces a measurement time of the second VUE, and improves efficiency of a reference signal measurement process.

It should be understood that a sequence of performing operation 304 and performing operations 301 to 303 is not limited in this embodiment. Operation 304 may be performed before operations 301 to 303, or operations 301 to 303 may be first performed, and then operation 304 is performed.

305. The first VUE sends the measurement configuration information to the second VUE.

In an embodiment, operation 305 needs to be performed after operation 302. For example, after receiving the feedback information sent by the second VUE in operation 202, the first VUE sends the measurement configuration information to the second VUE based on the feedback information.

In some embodiments of this application, after receiving the feedback information, the first VUE may learn that the second VUE has synchronized with the first VUE based on the SLSS. This avoids a waste of communication resources caused because the first VUE cannot process the received reference signal.

In an embodiment, operation 305 and operation 301 may be performed in parallel. For example, the first VUE sends synchronization information to the second VUE. The synchronization information includes the SLSS and the measurement configuration information.

In some embodiments of this application, the first VUE may send the synchronization information to a plurality of pieces of VUE in a cell in a broadcast manner, and the plurality of pieces of VUE in the cell include the second VUE. For example, the first VUE may send the synchronization information to the plurality of pieces of VUE at intervals, may send the synchronization information when intending to communicate with any one of the plurality of pieces of VUE, or may continuously send the synchronization information to the plurality of pieces of VUE. Alternatively, the first VUE may send the synchronization information to the plurality of pieces of VUE in another manner. This is not specifically limited herein.

In some embodiments of this application, the second VUE can synchronize, with no need to access the first VUE, with the first VUE based on the SLSS actively sent by the first VUE, and can learn of the identifier of the first VUE and the identifier of the reference signal of the first VUE based on the measurement configuration information actively sent by the first VUE. Further, the second VUE learns of the reference signal of the first VUE at the position of the unallocated time-frequency resource in the resource pool. Alternatively, the second VUE sends the feedback information to the first VUE to cause the first VUE to send the reference signal, and sends the measurement result to the first VUE after measuring the reference signal of the first VUE. This helps the first VUE quickly establish connections to other pieces of VUE in the cell.

306. The second VUE determines, based on the measurement configuration information and the reference signal, the measurement result that is of the reference signal and that is sent only by the first VUE.

In some embodiments of this application, the VUE autonomously selects a time-frequency resource. In this case, the second VUE may determine a time-frequency resource that is not used in the resource pool. After obtaining the measurement configuration information, the second VUE may determine a type of the to-be-measured reference signal sent by the first VUE, a measurement time interval, a type of a measurement result, a quantity of measurement results, and an identifier of the to-be-measured reference signal. The identifier of the to-be-measured reference signal may include identifiers of some reference signals sent by the first VUE, or may be identifiers of all reference signals sent by the first VUE.

The second VUE may obtain, at a corresponding position in the resource pool based on the identifier of the reference signal, the reference signal sent by the first VUE, and measure the reference signal at the indicated time interval. One measurement result reflects only quality of a reference signal sent by the first VUE at one time-frequency resource position by using a determined beam. Therefore, the second VUE may generate a plurality of measurement results after measuring, at a plurality of time-frequency resource positions, reference signals sent by using different beams. In this case, the second VUE may determine, based on a regulation on a quantity of reported measurement results, a measurement result that finally needs to be sent to the first VUE. For example, the second VUE may sort a plurality of measurement results obtained through measurement, and select several measurement results with best communication quality as measurement results to be sent to the first VUE.

307. The second VUE sends the measurement result of the reference signal to the first VUE.

In some embodiments of this application, after determining the measurement result that is of the reference signal and that is to be sent to the first VUE, the second VUE may send the measurement result to the first VUE. The first VUE determines, based on the measurement result sent by the second VUE, a time-frequency resource that is applicable to communication between the first VUE and the second VUE.

B. A Connection has been Established Between VUEs.

Figure 4:
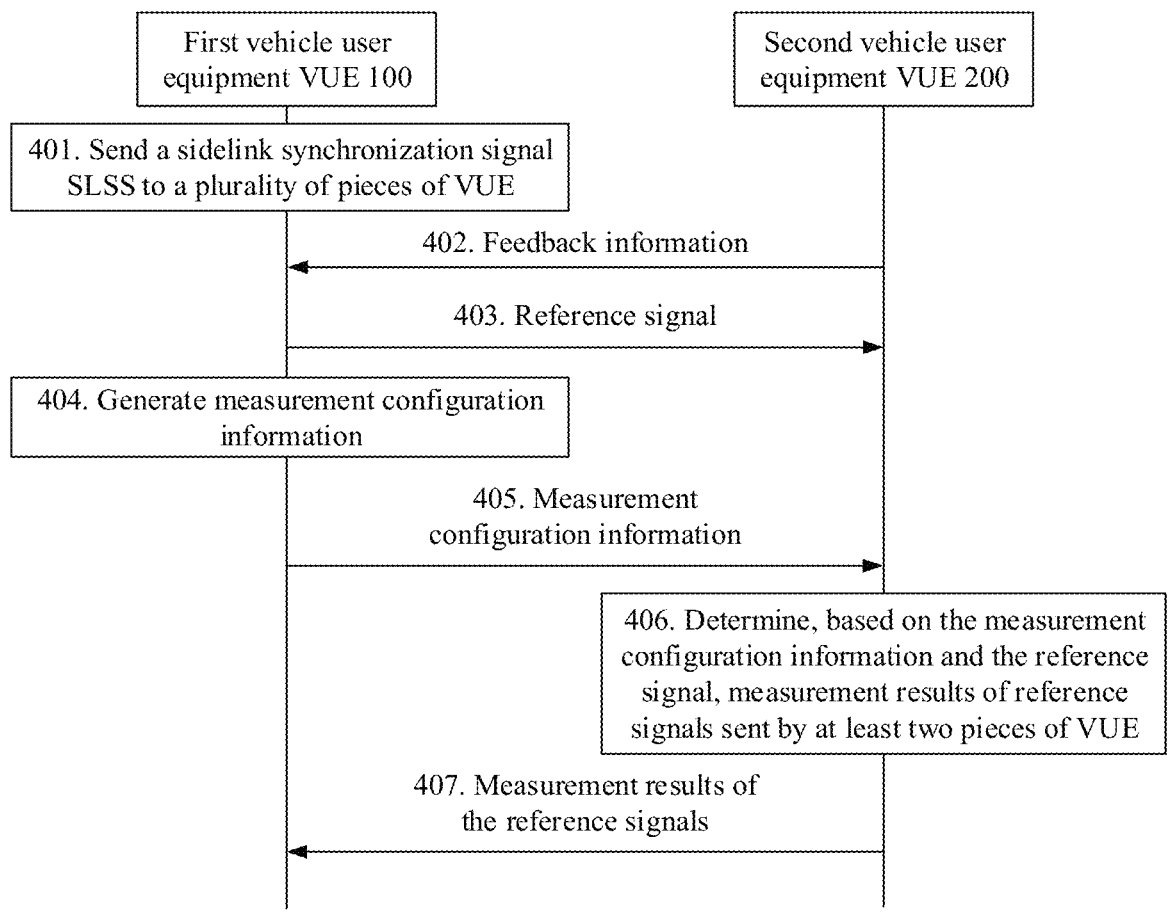
FIG. 4 is still another schematic flowchart of a reference signal measurement method according to an embodiment of this application.

For example, referring to FIG. 4, in the embodiment of this application, another embodiment of the reference signal measurement method may include the following operations.

In an embodiment of the application, operations 401 to 403 are similar to operations 301 to 303 in the foregoing embodiment in FIG. 3. Details are not described herein again.

404. The first VUE generates measurement configuration information.

In some embodiments of this application, the measurement configuration information includes a VUE list, a type of a to-be-measured reference signal, a measurement window configuration, a measurement configuration parameter, and a reference signal identifier.

The VUE list includes at least two terminal device identifiers that correspond one-to-one to at least two pieces of VUE, and the at least two terminal device identifiers are determined by the first VUE.

The type of the to-be-measured reference signal is used to indicate a type of the reference signal.

The measurement window configuration is used to indicate a measurement time interval.

The measurement configuration parameter is used to determine a quantity of measurement results that need to be reported and types of the measurement results.

The reference signal identifier is used to determine, in a plurality of reference signals sent by the first VUE, the reference signal that needs to be measured by the second VUE.

In some embodiments of this application, because a connection has been established between VUEs that perform D2D communication, the first VUE may store identifiers of other pieces of VUE. Therefore, the measurement configuration information generated by the first VUE may include identifiers of a plurality of pieces of VUE, and VUE identifiers included may be determined by the first VUE.

For example, the VUE list included in the measurement configuration information generated by the first VUE includes at least two terminal device identifiers, and the at least two terminal device identifiers may be the identifier of the first VUE and identifiers of a plurality of pieces of VUE adjacent to the first VUE, may be identifiers of all VUE stored in the first VUE, or the like. An identifier of a VUE included in the VUE list is determined by the first VUE, and is not limited herein.

In some embodiments of this application, the measurement configuration information generated by the first VUE not only includes the identifier of the first VUE, but also includes identifiers of other pieces of VUE in a cell in which the first VUE is located. In addition, the second VUE may learn of positions of unallocated time-frequency resources in a resource pool. In this case, the second VUE may learn of reference signal positions, so that the second VUE can measure reference signals of the other pieces of VUE at the reference signal positions based on the identifiers of the other pieces of VUE.

In some embodiments of this application, on a premise that the second VUE accesses only the first VUE, the second VUE may measure quality of communication with other pieces of VUE in the VUE list. If the second VUE finds, in a measurement process, that quality of communication between the second VUE and another piece of VUE in the VUE list is better, the second VUE may communicate with the another piece of VUE with the better communication quality in a timely manner. This helps the second VUE obtain better communication experience. In addition, in this scenario, because the terminal autonomously selects a time-frequency resource, a process in which the second VUE changes to-be-communicated VUE is more flexible.

In some embodiments of this application, because the first VUE may send the reference signal by using a plurality of beams, the quantity of measurement results may include a quantity of beams of the VUE, and the quantity of beams may be an upper limit of a quantity of beams reported by the second VUE. Therefore, the second VUE may flexibly determine the reporting quantity based on an actual situation with reference to the upper limit of the quantity.

In some embodiments of this application, the measurement configuration information generated by the first VUE includes only an identifier of the reference signal sent by the first VUE to the second VUE, and used to determine, in a plurality of reference signals sent by the first VUE by using a plurality of beams, a reference signal that needs to be measured by the second VUE, to prevent the second VUE from measuring all beams. This reduces a measurement time of the second VUE, and improves efficiency of a reference signal measurement process.

405. The first VUE sends the measurement configuration information to the second VUE.

In an embodiment, operation 405 needs to be performed after operation 402. For example, after receiving the feedback information sent by the second VUE in operation 402, the first VUE sends the measurement configuration information to the second VUE based on the feedback information.

In another embodiment, operation 405 and operation 401 may be performed in parallel. For example, the first VUE sends synchronization information to the second VUE. The synchronization information includes the SLSS and the measurement configuration information.

In some embodiments of this application, in this scenario, the measurement configuration information generated by the first VUE may include at least two terminal device identifiers, and the at least two terminal device identifiers may include a plurality of terminal device identifiers. In this case, the first VUE may configure the plurality of terminal device identifiers in one measurement configuration message. The first VUE may alternatively configure the plurality of terminal device identifiers by using a plurality of measurement configuration messages. For example, a VUE list in each measurement configuration message may include one terminal device identifier, or may include some of the plurality of terminal device identifiers.

406. The second VUE determines the measurement result of the reference signal based on the measurement configuration information and the reference signal.

In some embodiments of this application, the second VUE may measure the reference signal of the first VUE based on the measurement configuration information obtained in operation 405, and determine the measurement result that is of the reference signal and that needs to be sent to the first VUE.

In addition, because the measurement configuration information generated by the first VUE may further include identifiers of other pieces of VUE, in addition to determining the measurement result that is of the reference signal and that needs to be sent to the first VUE, the second VUE may further determine measurement results that are of reference signals and that need to be sent to the other pieces of VUE in the VUE list.

407. The second VUE sends the measurement result of the reference signal to the first VUE.

In some embodiments of this application, the second VUE may send the measurement result of the reference signal of the first VUE to the first VUE. The first VUE determines, based on the measurement result sent by the second VUE, a time-frequency resource that is applicable to communication between the first VUE and the second VUE.

In addition, the second VUE may further send a measurement result of a reference signal of another piece of VUE (for example, fourth VUE) to the another piece of VUE, so that the fourth VUE may select, based on the measurement result, a time-frequency resource applicable to communication between the second VUE and the fourth VUE.

3. The Third VUE Allocates a Time-Frequency Resource.

Figure 5:
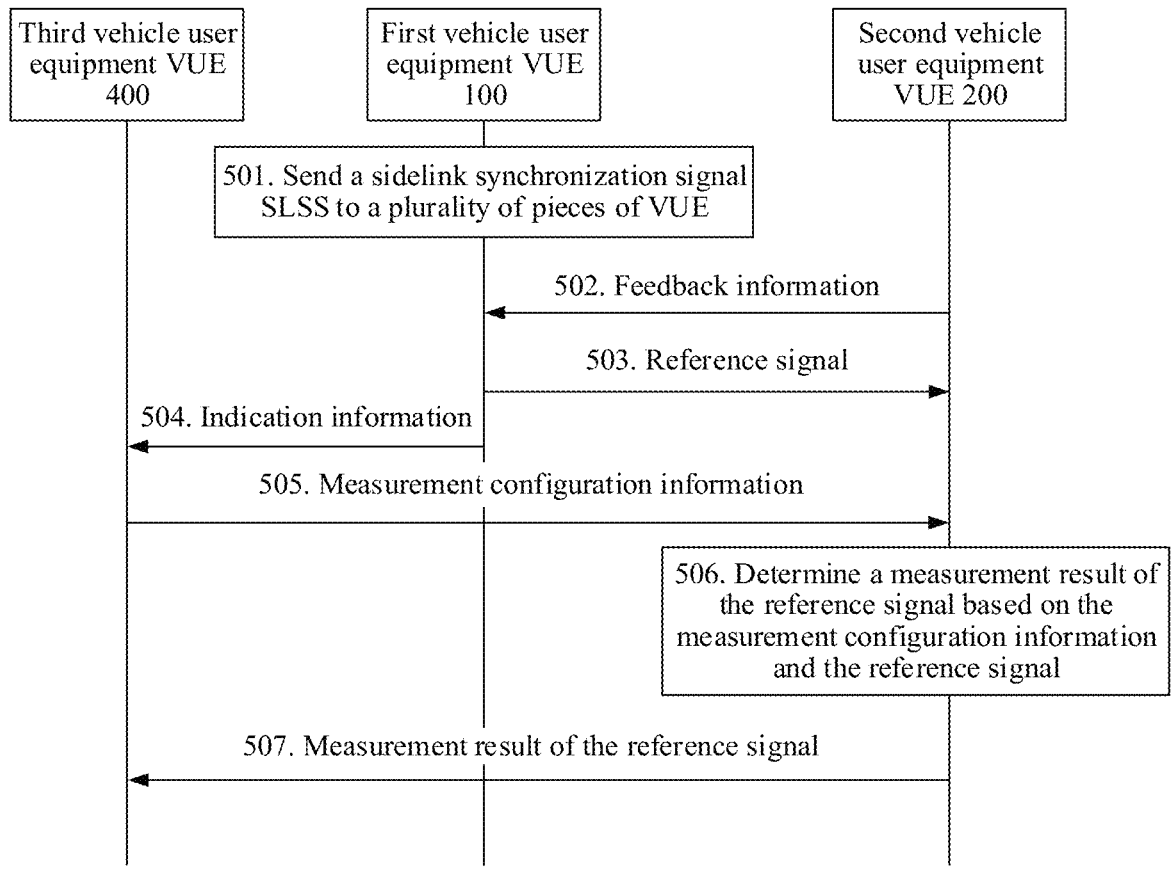
FIG. 5 is yet another schematic flowchart of a reference signal measurement method according to an embodiment of this application.

For example, referring to FIG. 5, in the embodiments of this application, another embodiment of the reference signal measurement method may include the following operations.

In an embodiment of the application, operations 501 to 503 are similar to operations 201 to 203 in the foregoing embodiment in FIG. 2. Details are not described herein again.

504. The first VUE sends indication information to the third VUE.

In some embodiments of this application, the third VUE and the first VUE are in a same group, and the third VUE is configured to allocate time-frequency resources to a plurality of terminals in the group. For example, the third VUE and the first VUE are two different vehicles in a same vehicle platoon, the third VUE is a vehicle at the head of the vehicle platoon, the first VUE is any vehicle in the vehicle platoon, and the second VUE may be any vehicle in the vehicle platoon, or may be a vehicle that has not joined the vehicle platoon.

In an embodiment, operation 504 needs to be performed after operation 502. For example, after receiving the feedback information sent by the second VUE, the first VUE may learn that the second VUE has performed a synchronization operation based on the SLSS. In addition, because the second VUE sends the feedback information, the first VUE may learn that the second VUE needs to communicate with another piece of VUE, that is, the third VUE needs to allocate a time-frequency resource to the second VUE. Therefore, the first VUE may send the indication information to the third VUE, and the indication information is used to indicate the third VUE to send the measurement configuration information to the second VUE.

In another embodiment, an execution sequence of operation 504 and operation 502 is not limited. For example, when the first VUE needs to communicate with the second VUE, the first VUE may send the indication information to the third VUE, to indicate the third VUE to send the measurement configuration information to the second VUE. This increases an implementation scenario of this solution, and improves integrity of this solution.

505. The third VUE sends the measurement configuration information to the second VUE.

In some embodiments of this application, the measurement configuration information sent by the third VUE to the second VUE is used to indicate the second VUE to measure, based on the measurement configuration information, the reference signal received by the second VUE from the first VUE, to obtain the measurement result of the reference signal.

The measurement configuration information includes a time-frequency resource list, a VUE list, a type of a to-be-measured reference signal, a measurement window configuration, a measurement configuration parameter, and a reference signal identifier.

A time-frequency resource included in the time-frequency resource list is a time-frequency resource available to a group to which the second VUE belongs, and the time-frequency resource list is used to indicate a position of a to-be-measured time-frequency resource.

The VUE list includes at least one terminal device identifier that corresponds one-to-one to at least one piece of VUE, VUE included in the at least one piece of VUE and the first VUE are in a same group, and the at least one terminal device identifier includes an identifier of the first VUE.

The type of the to-be-measured reference signal is used to indicate a type of the reference signal.

The measurement window configuration is used to indicate a measurement time interval.

The measurement configuration parameter is used to determine a quantity of measurement results that need to be reported and types of the measurement results.

The reference signal identifier is used to determine, in a plurality of reference signals sent by the first VUE, the reference signal that needs to be measured by the first terminal.

In some embodiments of this application, because the third VUE is responsible for allocating time-frequency resources to the plurality of pieces of VUE in the group, time-frequency resources that are included in the time-frequency resource list are determined by the third VUE.

For example, the third VUE may add all unallocated time-frequency resources in the resource pool of the group to which the second VUE belongs to the time-frequency resource list. Alternatively, the third VUE may add some unallocated time-frequency resources in the resource pool of the group to which the second VUE belongs to the time-frequency resource list based on time-frequency resource usage of the plurality of pieces of VUE. Alternatively, the third VUE may determine, based on historical time-frequency resource usage of the first VUE, time-frequency resources included in the time-frequency resource list. A time-frequency resource is flexibly selected by the third VUE based on an actual situation, and is not limited herein.

In some embodiments of this application, the VUE list included in the measurement configuration information sent by the third VUE includes at least one terminal device identifier, and the at least one terminal device identifier may be an identifier of the first VUE, may be an identifier of the first VUE and identifiers of a plurality of pieces of VUE that are adjacent to the first VUE and that are in the group to which the first VUE belongs, may be identifiers of all VUE in the group to which the first VUE belongs, or the like. VUE identifiers included in the VUE list are determined by the third VUE. This is not limited herein.

In some embodiments of this application, because different pieces of VUE may use different time-frequency resources, the measurement configuration information may further include a correspondence between a terminal device identifier and a time-frequency resource in the time-frequency resource list. In other words, each terminal device identifier corresponds to one time-frequency resource or at least two time-frequency resources.

In some embodiments of this application, the measurement configuration information sent by the third VUE not only includes the identifier of the first VUE and a time-frequency resource available to the first VUE, but also includes identifiers of other pieces of VUE in the group to which the first VUE belongs and corresponding time-frequency resources. Therefore, after completing synchronous access, the second VUE may obtain, based on the measurement configuration information sent by the third VUE, time-frequency resource positions of reference signals of the other pieces of VUE in the group to which the first VUE belongs, and further can measure, with no need to access each of the other pieces of VUE in the group, quality of communication with the other pieces of VUE in the group, thereby saving communication resources. In addition, according to an embodiment of the application, when the second VUE initially joins the group, the second VUE can communicate with the plurality of pieces of VUE in the group, thereby helping the second VUE obtain better communication experience.

In some embodiments of this application, because the measurement configuration information sent by the third VUE not only includes the identifier of the first VUE and the time-frequency resource position corresponding to the first VUE, but also includes the identifiers of the other pieces of VUE in the group to which the first VUE belongs and the time-frequency resource positions corresponding to the other pieces of VUE, the quantity of measurement results included in the measurement configuration information generated by the third VUE may include an amount of VUE and a quantity of beams of each VUE. The quantity of measurement results may be an upper limit of the quantity of measurement results reported by the second VUE, so that the second VUE can flexibly determine the reporting quantity based on an actual situation with reference to the upper limit of the quantity.

In some embodiments of this application, the reference signal identifier included in the measurement configuration information sent by the third VUE may include only an identifier of the reference signal sent by the first VUE to the second VUE, or may include identifiers of reference signals sent by the other pieces of VUE in the group to which the first VUE belongs and a correspondence between a reference signal identifier and a terminal device identifier. Reference signal identifiers that are included in the measurement configuration information sent by the third VUE are determined by the third VUE, and are not limited herein.

In some embodiments of this application, the first VUE may send a same reference signal by using a plurality of beams, reference signal identifiers of reference signals sent by using different beams are different, and there is a correspondence between a reference signal identifier and a beam. In this case, the third VUE may perform the following operations based on beam allocation of the first VUE: If the measurement configuration information carries one or at least two reference signal identifiers of the first VUE, when measuring the first VUE, the second VUE may select, from reference signals sent by the first VUE by using a plurality of beams, a beam corresponding to the reference signal identifier for measurement. This prevents the second VUE from measuring all beams sent by the first VUE, reduces a measurement time of the second VUE, and improves efficiency of a reference signal measurement process.

In some embodiments of this application, the VUE list in the measurement configuration information sent by the third VUE includes at least one terminal device identifier, and the at least one terminal device identifier may include a plurality of terminal device identifiers. In this case, the third VUE may configure the plurality of terminal device identifiers by using one public measurement configuration message, in other words, a VUE list in one measurement configuration message may include all of the plurality of terminal device identifiers. Alternatively, the third VUE may configure the plurality of terminal device identifiers by using a plurality of measurement configuration messages. For example, a VUE list in each measurement configuration message may include one terminal device identifier, or may include some of the plurality of terminal device identifiers.

506. The second VUE determines the measurement result of the reference signal based on the measurement configuration information and the reference signal.

In an embodiment of the application, operation 506 is similar to operation 207 in the foregoing embodiment in FIG. 2. Details are not described herein again.

507. The second VUE sends the measurement result of the reference signal to the third VUE.

In some embodiments of this application, after determining the measurement result that is of the reference signal and that needs to be sent to the third VUE, the second VUE may send the measurement result to the third VUE, so that the third VUE allocates a time-frequency resource to the second VUE based on the received measurement result. For example, the third VUE may not only allocate a time-frequency resource for communication between the second VUE and the first VUE, but also allocate a time-frequency resource to the second VUE and another piece of VUE in the group.

In some embodiments of this application, after receiving the feedback information sent by the second VUE, the first VUE may send the indication information to the third VUE, so that the third VUE sends the measurement configuration information to the second VUE based on the indication information. The second VUE may measure, based on the measurement configuration information, the reference signals sent by the first VUE and the another piece of VUE in the group to which the first VUE belongs, to obtain the measurement results of the reference signals, and directly send the measurement results to the third VUE, so that the second VUE can quickly join the group. In other words, the third VUE can quickly obtain information about the second VUE, and manage the second VUE. In addition, the second VUE can also quickly establish a connection to another piece of VUE in the group by using this solution. This helps the second VUE obtain better communication experience.

To better implement the foregoing solutions in the embodiments of this application, the following further provides a related apparatus configured to implement the solutions.

Figure 6:
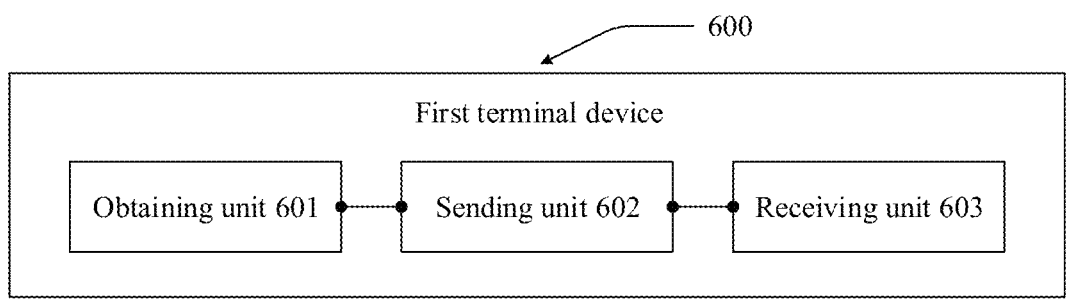
FIG. 6 is a schematic structural diagram of a first terminal device according to an embodiment of this application.

For example, FIG. 6 is a schematic structural diagram of a terminal device according to an embodiment of this application. The terminal device is a first terminal device, and the first terminal device includes an obtaining unit 601, a sending unit 602, and a receiving unit 603.

The obtaining unit 601 is configured to obtain measurement configuration information.

The sending unit 602 is configured to send the measurement configuration information to a second terminal device, where the measurement configuration information is used to indicate the second terminal device to measure, based on the measurement configuration information, a reference signal received by the second terminal device from the first terminal device, to obtain a measurement result of the reference signal.

The sending unit 602 is further configured to send the reference signal to the second terminal device.

The receiving unit 603 is configured to receive the measurement result that is of the reference signal and that is sent by the second terminal device.

In an embodiment of the application, the sending unit 602 sends the measurement configuration information and the reference signal to the second terminal device, so that the second terminal device determines the measurement result of the reference signal based on the measurement configuration information. Because the reference signal is obtained from the first terminal device, the measurement result reflects quality of a time-frequency resource used when the first terminal communicates with the second terminal. In this way, a reference signal measurement method applicable to a sidelink is provided.

In some embodiments of this application, the obtaining unit 601 is configured to: receive the measurement configuration information sent by a base station. The sending unit 602 is further configured to send the measurement result of the reference signal to the base station.

The measurement configuration information includes a time-frequency resource list, a terminal device list, a type of a to-be-measured reference signal, a measurement window configuration, a measurement configuration parameter, and a reference signal identifier.

The time-frequency resource list is used to indicate a position of a to-be-measured time-frequency resource.

The terminal device list includes at least one terminal device identifier that corresponds one-to-one to at least one terminal device, where the at least one terminal device identifier includes an identifier of the first terminal device.

The type of the to-be-measured reference signal is used to indicate a type of the reference signal.

The measurement window configuration is used to indicate a measurement time interval.

The measurement configuration parameter is used to determine a quantity of measurement results that need to be reported and types of the measurement results.

The reference signal identifier is used to determine, in a plurality of reference signals sent by the first terminal device, the reference signal that needs to be measured by the second terminal device.

In some embodiments of this application, the sending unit 602 is further configured to send a sidelink synchronization signal SLSS to a plurality of terminal devices in a group or in a cell, where the plurality of terminal devices in the group include the second terminal device.

The receiving unit 603 is further configured to receive feedback information sent by the second terminal device, where the feedback information is used by the first terminal device to determine that the second terminal device has performed a synchronization operation based on the SLSS.

The sending unit 602 is further configured to send indication information to the base station based on the feedback information, where the indication information is used to indicate the base station to send the measurement configuration information to the first terminal device.

In some embodiments of this application, the obtaining unit 601 is configured to: generate the measurement configuration information.

The measurement configuration information includes a terminal device identifier, a type of a to-be-measured reference signal, a measurement window configuration, a measurement configuration parameter, and a reference signal identifier.

The terminal device identifier is an identifier of the first terminal device.

The type of the to-be-measured reference signal is used to indicate a type of the reference signal.

The measurement window configuration is used to indicate a measurement time interval.

The measurement configuration parameter is used to determine a quantity of measurement results that need to be reported and types of the measurement results.

The reference signal identifier is an identifier of the reference signal sent by the first terminal device to the second terminal device.

In some embodiments of this application, the sending unit 602 is further configured to send a sidelink synchronization signal SLSS to a plurality of terminal devices in a group or in a cell, where the plurality of terminal devices in the group include the second terminal device.

The receiving unit 603 is further configured to receive feedback information sent by the second terminal device, where the feedback information is used by the first terminal device to determine that the second terminal device has performed a synchronization operation based on the SLSS.

The sending unit 602 is configured to: send the measurement configuration information to the second terminal device based on the feedback information.

In some embodiments of this application, the obtaining unit 601 is configured to: generate the measurement configuration information.

The measurement configuration information includes a terminal device list, a type of a to-be-measured reference signal, a measurement window configuration, a measurement configuration parameter, and a reference signal identifier.

The terminal device list includes at least two terminal device identifiers that correspond one-to-one to at least two terminal devices, where the at least two terminal device identifiers are determined by the first terminal device.

The type of the to-be-measured reference signal is used to indicate a type of the reference signal.

The measurement window configuration is used to indicate a measurement time interval.

The measurement configuration parameter is used to determine a quantity of measurement results that need to be reported and types of the measurement results.

The reference signal identifier is used to determine, in a plurality of reference signals sent by the first terminal device, the reference signal that needs to be measured by the second terminal device.

In some embodiments of this application, the sending unit 602 is configured to: send synchronization information to the second terminal device, where the synchronization information includes an SLSS and the measurement configuration information, and the SLSS is used by the second terminal device to perform a synchronization operation based on the SLSS.

In some embodiments of this application, the sending unit 602 is configured to: send the reference signal to a plurality of terminal devices in a group, where the plurality of terminal devices in the group include the second terminal device.

In some embodiments of this application, the sending unit 602 is further configured to send a sidelink synchronization signal SLSS to a plurality of terminal devices in a group, where the plurality of terminal devices in the group include the second terminal device.

The receiving unit 603 is further configured to receive feedback information sent by the second terminal device, where the feedback information is used by the first terminal device to determine that the second terminal device has performed a synchronization operation based on the SLSS.

The sending unit 602 is configured to: send the reference signal to the second terminal device based on the feedback information.

Figure 7:
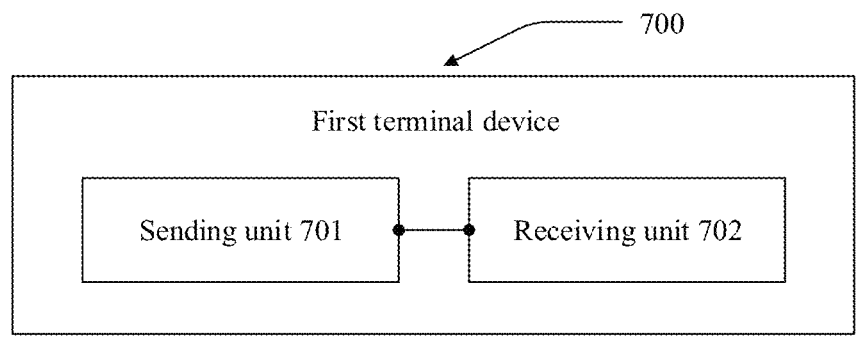
FIG. 7 is another schematic structural diagram of a first terminal device according to an embodiment of this application.

For example, FIG. 7 is a schematic structural diagram of a terminal device according to an embodiment of this application. The terminal device is a first terminal device 700, and the first terminal device 700 includes a sending unit 701.

The sending unit 701 is configured to send indication information to a third terminal device, where the indication information is used to indicate the third terminal device to send measurement configuration information to a second terminal device.

The sending unit 701 is further configured to send a reference signal to the second terminal device, where the measurement configuration information is used by the second terminal device to measure, based on the measurement configuration information, the reference signal received by the second terminal device from the first terminal device, to obtain a measurement result of the reference signal.

The third terminal device and the first terminal device are in a same group, and the third terminal device is configured to allocate time-frequency resources to a plurality of terminals in the group.

In an embodiment of the application, the sending unit 701 may send the indication information to the third terminal device, so that the third indication information sends the measurement configuration information to the second terminal device. The second terminal device may measure, based on the measurement configuration information, the reference signal sent by the first terminal device, to obtain the measurement result of the reference signal, and directly send the measurement result to the third terminal device. In this way, the second terminal device can quickly join the group.

In some embodiments of this application, the sending unit 701 is further configured to send a sidelink synchronization signal SLSS to a plurality of terminal devices in a group, where the plurality of terminal devices in the group include the second terminal device.

The first terminal device 700 may further include a receiving unit 702, configured to receive feedback information sent by the second terminal device, where the feedback information is used by the first terminal device to determine that the second terminal device has performed a synchronization operation based on the SLSS.

The sending unit 701 is configured to: send indication information to the third terminal device based on the feedback information.

In some embodiments of this application, the measurement configuration information includes a time-frequency resource list, a terminal device list, a type of a to-be-measured reference signal, a measurement window configuration, a measurement configuration parameter, and a reference signal identifier.

A time-frequency resource included in the time-frequency resource list is a time-frequency resource available to a group to which the second terminal device belongs, and the time-frequency resource list is used to indicate a position of a to-be-measured time-frequency resource.

The terminal device list includes at least one terminal device identifier that corresponds one-to-one to at least one terminal device, each of the at least one terminal device is in the group, and the at least one terminal device identifier includes an identifier of the first terminal device.

The type of the to-be-measured reference signal is used to indicate a type of the reference signal.

The measurement window configuration is used to indicate a measurement time interval.

The measurement configuration parameter is used to determine a quantity of measurement results that need to be reported and types of the measurement results.

The reference signal identifier is used to determine, in a plurality of reference signals sent by the first terminal device, the reference signal that needs to be measured by the first terminal.

In some embodiments of this application, the sending unit 701 is configured to:
send the reference signal to a plurality of terminal devices in a group, where the plurality of terminal devices in the group include the second terminal device; or
send a sidelink synchronization signal SLSS to a plurality of terminal devices in a group, where the plurality of terminal devices in the group include the second terminal device; receive feedback information sent by the second terminal device, where the feedback information is used by the first terminal device to determine that the second terminal device has performed a synchronization operation based on the SLSS; and send the reference signal to the second terminal device based on the feedback information.

Figure 8:
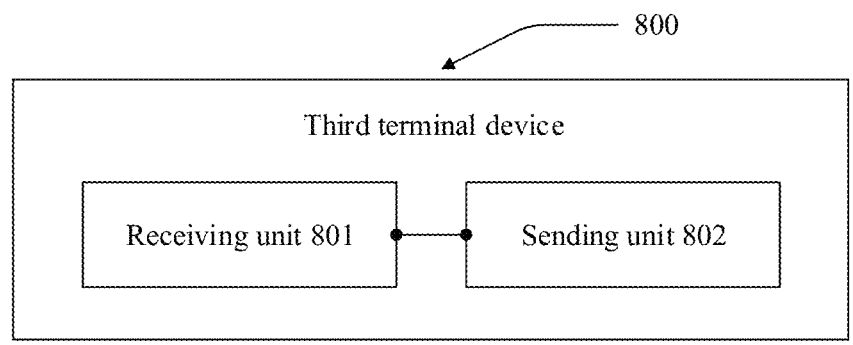
FIG. 8 is a schematic structural diagram of a third terminal device according to an embodiment of this application.

For example, FIG. 8 is a schematic structural diagram of a terminal device according to an embodiment of this application. The terminal device is a third terminal device 800, and the third terminal device 800 includes a receiving unit 801 and a sending unit 802.

The receiving unit 801 is configured to receive indication information from a first terminal device, where the indication information is used to indicate the third terminal device to send measurement configuration information to a second terminal device.

The sending unit 802 is configured to send the measurement configuration information to the second terminal device, where the measurement configuration information is used to indicate the second terminal device to measure, based on the measurement configuration information, a reference signal received by the second terminal device from the first terminal device, to obtain a measurement result of the reference signal.

The receiving unit 801 is further configured to receive the measurement result that is of the reference signal and that is sent by the second terminal device.

The third terminal device and the first terminal device are in a same group, and the third terminal device is configured to allocate time-frequency resources to a plurality of terminals in the group.

In an embodiment of the application, after the receiving unit 801 receives the indication information sent by the first terminal device, the sending unit 802 sends the measurement configuration information to the second terminal device, so that the second terminal device can measure, based on the measurement configuration information, the reference signal sent by the first terminal device, to obtain the measurement result of the reference signal. Then, the receiving unit 801 receives the measurement result of the reference signal, so that the second terminal device can quickly join the group.

In some embodiments of this application, the measurement configuration information includes a time-frequency resource list, a terminal device list, a type of a to-be-measured reference signal, a measurement window configuration, a measurement configuration parameter, and a reference signal identifier.

A time-frequency resource included in the time-frequency resource list is a time-frequency resource available to a group to which the second terminal device belongs, and the time-frequency resource list is used to indicate a position of a to-be-measured time-frequency resource.

The terminal device list includes at least one terminal device identifier that corresponds one-to-one to at least one terminal device, each of the at least one terminal device is in the group, and the at least one terminal device identifier includes an identifier of the first terminal device.

The type of the to-be-measured reference signal is used to indicate a type of the reference signal.

The measurement window configuration is used to indicate a measurement time interval.

The measurement configuration parameter is used to determine a quantity of measurement results that need to be reported and types of the measurement results.

The reference signal identifier is used to determine, in a plurality of reference signals sent by the first terminal device, the reference signal that needs to be measured by the first terminal.

Figure 9:
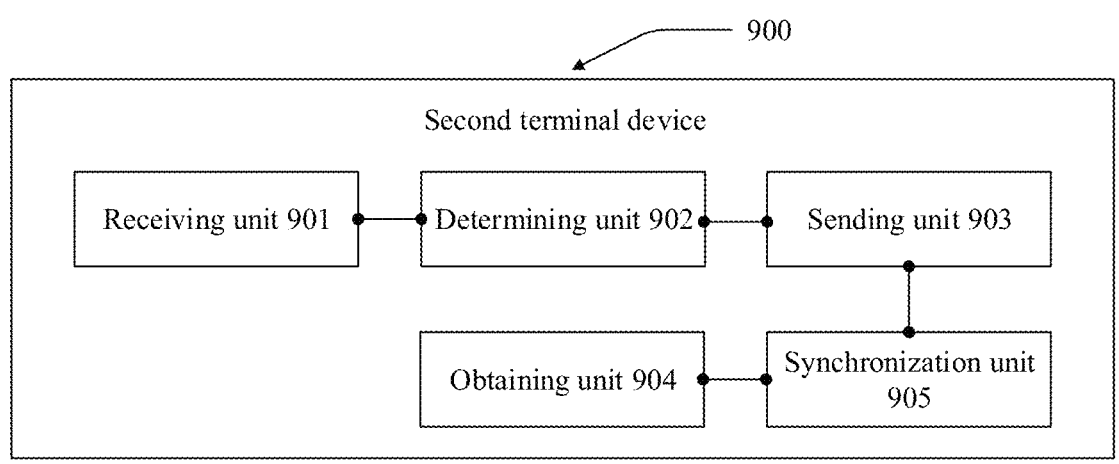
FIG. 9 is a schematic structural diagram of a second terminal device according to an embodiment of this application.

For example, FIG. 9 is a schematic structural diagram of a terminal device according to an embodiment of this application. The terminal device is a second terminal device 900, and the second terminal device 900 includes a receiving unit 901, a determining unit 902, and a sending unit 903.

The receiving unit 901 is configured to receive measurement configuration information from a first terminal device, where the measurement configuration information is used to indicate the second terminal device to measure, based on the measurement configuration information, a reference signal received by the second terminal device from the first terminal device.

The receiving unit 901 is further configured to receive the reference signal from the first terminal device.

The determining unit 902 is configured to determine a measurement result of the reference signal based on the measurement configuration information and the reference signal.

The sending unit 903 is configured to send the measurement result of the reference signal to the first terminal device.

In an embodiment of the application, the receiving unit 901 receives the measurement configuration information and the reference signal that are sent by the first terminal device, and determines the measurement result of the reference signal based on the measurement configuration information. Because the reference signal is obtained from the first terminal device, the measurement result reflects quality of a time-frequency resource used when the first terminal communicates with the second terminal. In this way, a reference signal measurement method applicable to a sidelink is provided.

In some embodiments of this application, the second terminal device 900 further includes:
an obtaining unit 904, configured to obtain a sidelink synchronization signal SLSS from the first terminal device; and
a synchronizing unit 905, configured to perform a synchronization operation based on the SLSS.

The sending unit 903 is further configured to send feedback information to the first terminal device, where the feedback information is used to indicate the first terminal device to send the measurement configuration information to the second terminal device.

In some embodiments of this application, the measurement configuration information includes a time-frequency resource list, a terminal device list, a type of a to-be-measured reference signal, a measurement window configuration, a measurement configuration parameter, and a reference signal identifier.

The time-frequency resource list is used to indicate a position of a to-be-measured time-frequency resource.

The terminal device list includes at least one terminal device identifier that corresponds one-to-one to at least one terminal device, where the at least one terminal device identifier includes an identifier of the first terminal device.

The type of the to-be-measured reference signal is used to indicate a type of the reference signal.

The measurement window configuration is used to indicate a measurement time interval.

The measurement configuration parameter is used to determine a quantity of measurement results that need to be reported and types of the measurement results.

The reference signal identifier is used to determine, in a plurality of reference signals sent by the first terminal device, the reference signal that needs to be measured by the second terminal device.

In some embodiments of this application, the measurement configuration information includes a terminal device identifier, a type of a to-be-measured reference signal, a measurement window configuration, a measurement configuration parameter, and a reference signal identifier.

The terminal device identifier is an identifier of the first terminal device.

The type of the to-be-measured reference signal is used to indicate a type of the reference signal.

The measurement window configuration is used to indicate a measurement time interval.

The measurement configuration parameter is used to determine a quantity of measurement results that need to be reported and types of the measurement results.

The reference signal identifier is an identifier of the reference signal sent by the first terminal device to the second terminal device.

In some embodiments of this application, the measurement configuration information includes a terminal device list, a type of a to-be-measured reference signal, a measurement window configuration, a measurement configuration parameter, and a reference signal identifier.

The terminal device list includes at least two terminal device identifiers that correspond one-to-one to at least two terminal devices, where the at least two terminal device identifiers are determined by the first terminal device.

The type of the to-be-measured reference signal is used to indicate a type of the reference signal.

The measurement window configuration is used to indicate a measurement time interval.

The measurement configuration parameter is used to determine a quantity of measurement results that need to be reported and types of the measurement results.

The reference signal identifier is used to determine, in a plurality of reference signals sent by the first terminal device, the reference signal that needs to be measured by the second terminal device.

In an embodiment of the application, the receiving unit 901 is configured to:
receive the reference signal sent by the first terminal device to a plurality of terminal devices in a group.

In an embodiment of the application, the feedback information is further used to indicate the first terminal device to send the reference signal to the second terminal device. The receiving unit 901 is configured to: receive the reference signal after the sending unit 903 sends the feedback information to the first terminal device.

Figure 10:
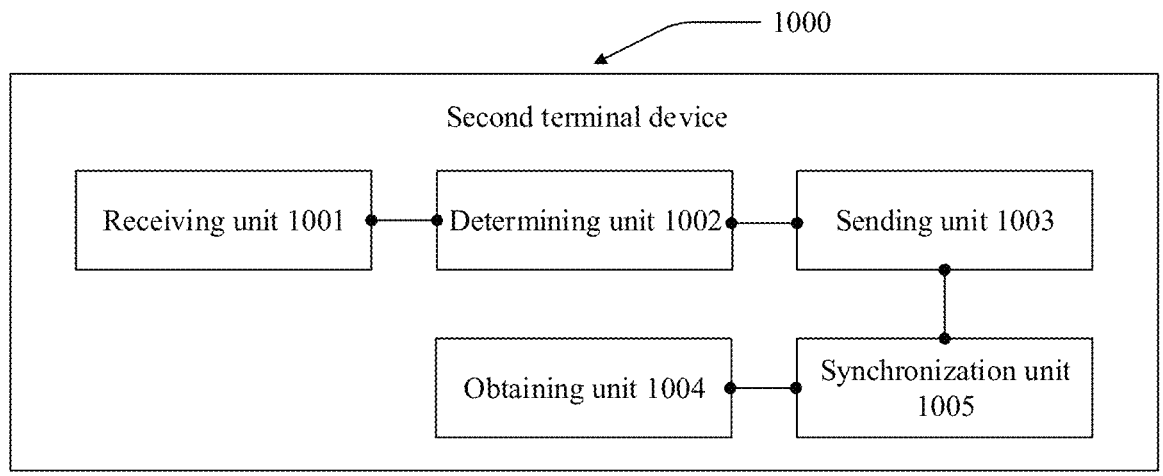
FIG. 10 is another schematic structural diagram of a second terminal device according to an embodiment of this application.

For example, FIG. 10 is a schematic structural diagram of a terminal device according to an embodiment of this application. The terminal device is a second terminal device 1000, and the second terminal device 1000 includes a receiving unit 1001, a determining unit 1002, and a sending unit 1003.

The receiving unit 1001 is configured to receive measurement configuration information from a third terminal device, where the measurement configuration information is used to indicate the second terminal device to measure, based on the measurement configuration information, a reference signal received by the second terminal device from a first terminal device.

The receiving unit 1001 is further configured to receive the reference signal from the first terminal device.

The determining unit 1002 is configured to determine a measurement result of the reference signal based on the measurement configuration information and the reference signal.

The sending unit 1003 is configured to send the measurement result of the reference signal to the third terminal device.

The third terminal device and the first terminal device are in a same group, and the third terminal device is configured to allocate time-frequency resources to a plurality of terminals in the group.

In an embodiment of the application, the receiving unit 1001 may receive the measurement configuration information sent by the third terminal device, measure, based on the measurement configuration information, the reference signal sent by the first terminal device, to obtain the measurement result of the reference signal, and then send the measurement result of the reference signal to the third terminal device. In this way, the second terminal device can quickly join the group.

In some embodiments of this application, the measurement configuration information includes a time-frequency resource list, a terminal device list, a type of a to-be-measured reference signal, a measurement window configuration, a measurement configuration parameter, and a reference signal identifier.

A time-frequency resource included in the time-frequency resource list is a time-frequency resource available to a group to which the second terminal device belongs, and the time-frequency resource list is used to indicate a position of a to-be-measured time-frequency resource.

The terminal device list includes at least one terminal device identifier that corresponds one-to-one to at least one terminal device, each of the at least one terminal device is in the group, and the at least one terminal device identifier includes an identifier of the first terminal device.

The type of the to-be-measured reference signal is used to indicate a type of the reference signal.

The measurement window configuration is used to indicate a measurement time interval.

The measurement configuration parameter is used to determine a quantity of measurement results that need to be reported and types of the measurement results.

The reference signal identifier is used to determine, in a plurality of reference signals sent by the first terminal device, the reference signal that needs to be measured by the first terminal.

In some embodiments of this application, the second terminal device 1000 further includes:
  an obtaining unit 1004, configured to obtain a sidelink synchronization signal SLSS from the first terminal device; and
  a synchronizing unit 1005, configured to perform a synchronization operation based on the SLSS.

The sending unit 1003 is further configured to send feedback information to the first terminal device, where the feedback information is used to notify the first terminal device that the second terminal device has performed the synchronization operation.

It should be noted that content such as information exchange between the modules/units of the apparatus and the execution processes thereof is based on the same idea as the method embodiments of this application, and produces the same technical effects as the method embodiments of this application. For the content, refer to the foregoing descriptions in the method embodiments of this application. Details are not described herein again.

Figure 11:
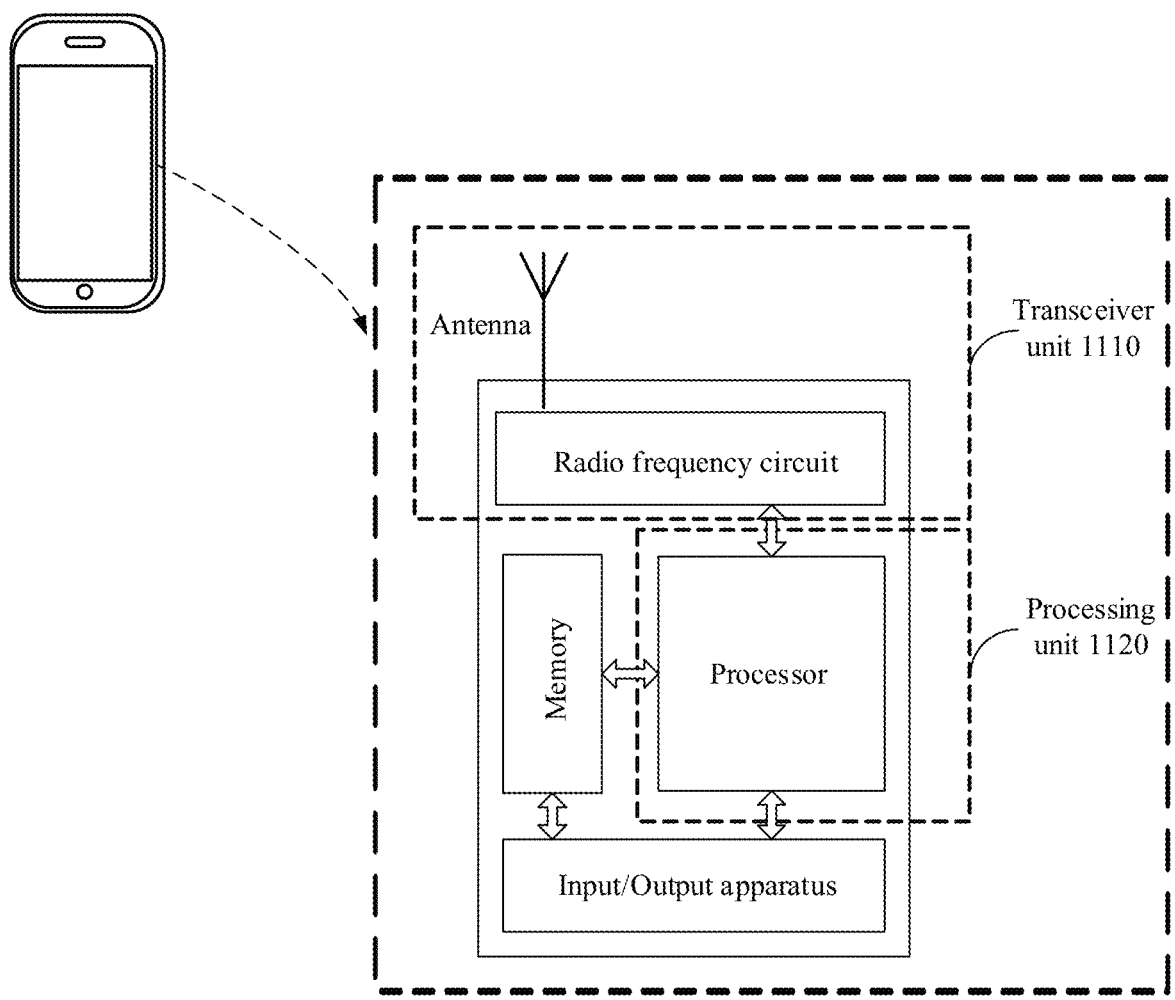
FIG. 11 is a schematic structural diagram of a communications device according to an embodiment of this application.

The following describes a communications device provided in an embodiment of this application. FIG. 11 is a schematic structural diagram of the communications device provided in an embodiment of the application. The communications apparatus may be a terminal device. The communications apparatus may be configured to perform an action performed by the first VUE in the foregoing method embodiments, configured to perform an action performed by the second VUE in the foregoing method embodiments, or configured to perform an action performed by the third VUE in the foregoing method embodiments.

When the communications apparatus is a terminal device, FIG. 11 is a simplified schematic structural diagram of the terminal device. For ease of understanding and illustration, in FIG. 11, an example in which the terminal device is a mobile phone is used. As shown in FIG. 11, the terminal device includes a processor, a memory, a radio frequency circuit, an antenna, and an input/output apparatus. The processor is mainly configured to: process a communications protocol and communications data, control the terminal device, execute a software program, process data of the software program, and so on. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user, and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave by using the antenna. When data is sent to the terminal device, the radio frequency circuit receives a radio frequency signal through the antenna, converts the radio frequency signal into a baseband signal, and outputs the baseband signal to the processor; and the processor converts the baseband signal into data, and processes the data. For ease of description, FIG. 11 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In the embodiments of this application, the antenna and the radio frequency circuit that have receiving and sending functions may be considered as a transceiver unit of the terminal device, and the processor that has a processing function may be considered as a processing unit of the terminal device. As shown in FIG. 11, the terminal device includes a transceiver unit 1110 and a processing unit 1120. The transceiver unit may also be referred to as a transceiver, a transceiver machine, a transceiver apparatus, or the like. The processing unit may also be referred to as a processor, a processing board, a processing module, a processing apparatus, or the like. In an embodiment, a component for implementing a receiving function in the transceiver unit 1110 may be considered as a receiving unit, and a component for implementing a sending function in the transceiver unit 1110 may be considered as a sending unit. In other words, the transceiver unit 1110 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1110 is configured to perform the sending operation and the receiving operation on a terminal device side in the foregoing method embodiments, and the processing unit 1120 is configured to perform another operation excluding the receiving operation and the sending operation of the terminal device in the foregoing method embodiments.

For example, in an embodiment, the transceiver unit 1110 is configured to perform the sending operations on the first VUE side in step 201, step 203, step 204, step 206, and step 209 in FIG. 2, or the transceiver unit 1110 is further configured to perform the receiving operations on the first VUE side in step 202, step 205, and step 208 and/or the transceiver unit 1110 is further configured to perform another receiving/sending step on the first VUE side in the embodiments of this application. The processing unit 1120 is configured to perform processing steps performed by the first VUE in the embodiments of this application.

For another example, in another embodiment, the transceiver unit 1110 is configured to perform the sending operations on the second VUE side in step 202 and step 208 in FIG. 2 or the receiving operations on the second VUE side in step 203 and step 206, and/or the transceiver unit 1110 is further configured to perform another sending and receiving step on the second VUE side in the embodiments of this application. The processing unit 1120 is configured to perform step 207 in FIG. 2, and/or the processing unit 1120 is further configured to perform another processing step performed by the second VUE in the embodiments of this application.

For another example, in another embodiment, the transceiver unit 1110 is configured to perform the sending operations on the first VUE side in step 301, step 303, and step 305 in FIG. 3 or the receiving operations on the first VUE side in step 302 and step 307, and/or the transceiver unit 1110 is further configured to perform another sending and receiving step on the first VUE side in the embodiments of this application. The processing unit 1120 is configured to perform step 304 in FIG. 3, and/or the processing unit 1120 is further configured to perform another processing step on the first VUE side in the embodiments of this application.

For another example, in another embodiment, the transceiver unit 1110 is configured to perform the receiving operations on the second VUE side in step 301, step 303, and step 305 in FIG. 3 or the sending operations on the second VUE side in step 302 and step 307, and/or the transceiver unit 1110 is further configured to perform another sending and receiving step on the second VUE side in the embodiments of this application. The processing unit 1120 is configured to perform step 306 in FIG. 3, and/or the processing unit 1120 is further configured to perform another processing step on the second VUE side in the embodiments of this application.

For another example, in another embodiment, the transceiver unit 1110 is configured to perform the sending operations on the first VUE side in step 401, step 403, and step 405 in FIG. 4 or the receiving operations on the first VUE side in step 402 and step 407, and/or the transceiver unit 1110 is further configured to perform another sending and receiving step on the first VUE side in the embodiments of this application. The processing unit 1120 is configured to perform step 404 in FIG. 3, and/or the processing unit 1120 is further configured to perform another processing step on the first VUE side in the embodiments of this application.

For another example, in another embodiment, the transceiver unit 1110 is configured to perform the receiving operations on the second VUE side in step 401, step 403, and step 405 in FIG. 4 or the sending operations on the second VUE side in step 402 and step 407, and/or the transceiver unit 1110 is further configured to perform another sending and receiving step on the second VUE side in the embodiments of this application. The processing unit 1120 is configured to perform step 406 in FIG. 4, and/or the processing unit 1120 is further configured to perform another processing step on the second VUE side in the embodiments of this application.

For another example, in another embodiment, the transceiver unit 1110 is configured to perform the sending operations on the first VUE side in step 501, step 503, and step 504 in FIG. 5 or the receiving operation on the first VUE side in step 502, and/or the transceiver unit 1110 is further configured to perform another sending and receiving step on the first VUE side in the embodiments of this application. The processing unit 1120 is configured to perform processing steps on the first VUE side in the embodiments of this application.

For another example, in another embodiment, the transceiver unit 1110 is configured to perform the receiving operations on the second VUE side in step 503, and step 505 in FIG. 5 or the sending operations on the second VUE side in step 502 and step 507, and/or the transceiver unit 1110 is further configured to perform another sending and receiving step on the second VUE side in the embodiments of this application. The processing unit 1120 is configured to perform step 506 in FIG. 5, and/or the processing unit 1120 is further configured to perform another processing step on the second VUE side in the embodiments of this application.

For another example, in another embodiment, the transceiver unit 1110 is configured to perform the receiving operations on the third VUE side in step 504, and step 507 in FIG. 5 or the sending operation on the third VUE side in step 505, and/or the transceiver unit 1110 is further configured to perform another sending and receiving step on the third VUE side in the embodiments of this application. The processing unit 1120 is configured to perform processing steps on the third VUE side in the embodiments of this application.

In an embodiment, a computer-readable storage medium is provided. The computer-readable storage medium stores instructions. When the instructions are executed, the method on the first VUE side in the foregoing method embodiment in FIG. 2 or FIG. 3 is performed.

In an embodiment, a computer-readable storage medium is provided. The computer-readable storage medium stores instructions. When the instructions are executed, the method on the second VUE side in the foregoing method embodiment in FIG. 2 or FIG. 3 is performed.

In an embodiment, a computer-readable storage medium is provided. The computer-readable storage medium stores instructions. When the instructions are executed, the method on the first VUE side in the foregoing method embodiment in FIG. 4 is performed.

In an embodiment, a computer-readable storage medium is provided. The computer-readable storage medium stores instructions. When the instructions are executed, the method on the second VUE side in the foregoing method embodiment in FIG. 4 is performed.

In an embodiment, a computer-readable storage medium is provided. The computer-readable storage medium stores instructions. When the instructions are executed, the method on the third VUE side in the foregoing method embodiment in FIG. 4 is performed.

In an embodiment, a computer program product that includes instructions is provided. When the instructions are executed, the method on the first VUE side in the foregoing method embodiment in FIG. 2 or FIG. 3 is performed.

In an embodiment, a computer program product that includes instructions is provided. When the instructions are executed, the method on the second VUE side in the foregoing method embodiment in FIG. 2 or FIG. 3 is performed.

In an embodiment, a computer program product that includes instructions is provided. When the instructions are executed, the method on the first VUE side in the foregoing method embodiment in FIG. 4 is performed.

In an embodiment, a computer program product that includes instructions is provided. When the instructions are executed, the method on the second VUE side in the foregoing method embodiment in FIG. 4 is performed.

In an embodiment, a computer program product that includes instructions is provided. When the instructions are executed, the method on the third VUE side in the foregoing method embodiment in FIG. 4 is performed.

It should be understood that, the processor mentioned in the embodiments of the present disclosure may be a central processing unit (CPU), or may be another general-purpose processor, a digital signal processor (DSP), an application-specific integrated circuit (ASIC), a field programmable gate array (FPGA) or another programmable logic device, discrete gate, or transistor logic device, a discrete hardware component, or the like. The general-purpose processor may be a microprocessor, or the processor may be any conventional processor, or the like.

It should further be understood that the memory in the embodiments of the present disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory is integrated into the processor. It should be noted that the memory described in this specification aims to include but is not limited to these memories and any memory of another proper type.

What is claimed is:

1. A reference signal measurement method, comprising:
    obtaining, by a first terminal device, measurement configuration information;
    sending, by the first terminal device, the measurement configuration information to a second terminal device, wherein the measurement configuration information is used to instruct the second terminal device to measure, based on the measurement configuration information, a reference signal received by the second terminal device from the first terminal device, to obtain a measurement result of the reference signal;
    sending, by the first terminal device, the reference signal to the second terminal device; and
    receiving, by the first terminal device, the measurement result of the reference signal sent by the second terminal device.

2. The method according to claim 1, wherein the obtaining measurement configuration information comprises:
    receiving, by the first terminal device, the measurement configuration information sent by a base station, wherein
    the measurement configuration information comprises a time-frequency resource list, a terminal device list, a type of a to-be-measured reference signal, a measurement window configuration, a measurement configuration parameter, and a reference signal identifier;
    the time-frequency resource list is used to indicate a position of a to-be-measured time-frequency resource;
    the terminal device list comprises at least one terminal device identifier that corresponds one-to-one to at least one terminal device, wherein the at least one terminal device identifier comprises an identifier of the first terminal device;
    the type of the to-be-measured reference signal is used to indicate a type of the reference signal;
    the measurement window configuration is used to indicate a measurement time interval;
    the measurement configuration parameter is used to determine a quantity of measurement results that need to be reported and types of the measurement results; and
    the reference signal identifier is used to determine, in a plurality of reference signals sent by the first terminal device, the reference signal that needs to be measured by the second terminal device.

3. The method according to claim 2, further comprising:
    sending, by the first terminal device, a sidelink synchronization signal (SLSS) to a plurality of terminal devices in a group comprising the second terminal device;
    receiving, by the first terminal device, feedback information sent by the second terminal device, wherein the feedback information is used by the first terminal device to determine that the second terminal device has performed a synchronization operation based on the SLSS; and
    sending, by the first terminal device, indication information to the base station based on the feedback information, wherein the indication information is used to indicate the base station to send the measurement configuration information to the first terminal device.

4. The method according to claim 1, wherein the obtaining measurement configuration information comprises:
    generating, by the first terminal device, the measurement configuration information comprising a terminal device identifier, a type of a to-be-measured reference signal, a measurement window configuration, a measurement configuration parameter, and a reference signal identifier; wherein
    the terminal device identifier is the identifier of the first terminal device;
    the type of the to-be-measured reference signal is used to indicate a type of the reference signal;
    the measurement window configuration is used to indicate a measurement time interval;
    the measurement configuration parameter is used to determine a quantity of measurement results that need to be reported and types of the measurement results; and the reference signal identifier is the identifier of the reference signal sent by the first terminal device to the second terminal device.

5. The method according to claim 4, further comprising:
sending, by the first terminal device, a sidelink synchronization signal SLSS to a plurality of terminal devices in a group comprising the second terminal device; and
receiving, by the first terminal device, feedback information sent by the second terminal device, wherein the feedback information is used by the first terminal device to determine that the second terminal device has performed a synchronization operation based on the SLSS; and
the sending, by the first terminal device, the measurement configuration information to a second terminal device comprises:
sending, by the first terminal device, the measurement configuration information to the second terminal device based on the feedback information.

6. The method according to claim 1, wherein the obtaining measurement configuration information comprises:
generating, by the first terminal device, the measurement configuration information comprising a terminal device list, a type of a to-be-measured reference signal, a measurement window configuration, a measurement configuration parameter, and a reference signal identifier; wherein
the terminal device list comprises at least two terminal device identifiers that correspond one-to-one to at least two terminal devices, wherein the at least two terminal device identifiers are determined by the first terminal device;
the type of the to-be-measured reference signal is used to indicate a type of the reference signal;
the measurement window configuration is used to indicate a measurement time interval;
the measurement configuration parameter is used to determine a quantity of measurement results that need to be reported and types of the measurement results; and
the reference signal identifier is used to determine, in a plurality of reference signals sent by the first terminal device, the reference signal that needs to be measured by the second terminal device.

7. The method according to claim 4, wherein the sending the measurement configuration information to a second terminal device comprises:
sending, by the first terminal device, synchronization information to the second terminal device, wherein the synchronization information comprises an SLSS and the measurement configuration information, and the SLSS is used by the second terminal device to perform a synchronization operation based on the SLSS.

8. The method of claim 1, wherein the sending, by the first terminal device, the reference signal to the second terminal device comprises:
sending, by the first terminal device, the reference signal to a plurality of terminal devices in a group, wherein the plurality of terminal devices in the group comprise the second terminal device; or
sending, by the first terminal device, a sidelink synchronization signal (SLSS) to a plurality of terminal devices in a group comprising the second terminal device;
receiving, by the first terminal device, feedback information sent by the second terminal device, wherein the feedback information is used by the first terminal device to determine that the second terminal device has performed a synchronization operation based on the SLSS; and
sending, by the first terminal device, the reference signal to the second terminal device based on the feedback information.

9. A reference signal measurement method, comprising:
receiving, by a second terminal device, measurement configuration information from a first terminal device, wherein the measurement configuration information is used to instruct the second terminal device to measure, based on the measurement configuration information, a reference signal received by the second terminal device from the first terminal device;
receiving, by the second terminal device, the reference signal from the first terminal device;
determining, by the second terminal device, a measurement result of the reference signal based on the measurement configuration information and the reference signal; and
sending, by the second terminal device, the measurement result of the reference signal to the first terminal device.

10. The method according to claim 9, wherein the measurement configuration information comprises a time-frequency resource list, a terminal device list, a type of a to-be-measured reference signal, a measurement window configuration, a measurement configuration parameter, and a reference signal identifier; wherein
the time-frequency resource list is used to indicate a position of a to-be-measured time-frequency resource;
the terminal device list comprises at least one terminal device identifier that corresponds one-to-one to at least one terminal device, wherein the at least one terminal device identifier comprises an identifier of the first terminal device;
the type of the to-be-measured reference signal is used to indicate a type of the reference signal;
the measurement window configuration is used to indicate a measurement time interval;
the measurement configuration parameter is used to determine a quantity of measurement results that need to be reported and types of the measurement results; and
the reference signal identifier is used to determine, in a plurality of reference signals sent by the first terminal device, the reference signal that needs to be measured by the second terminal device.

11. The method according to claim 9, further comprising:
obtaining, by the second terminal device, a sidelink synchronization signal (SLSS) from the first terminal device;
performing, by the second terminal device, a synchronization operation based on the SLSS; and
sending, by the second terminal device, feedback information to the first terminal device, wherein the feedback information is used to indicate the first terminal device to send the measurement configuration information to the second terminal device, wherein
the measurement configuration information comprises a terminal device identifier, a type of a to-be-measured reference signal, a measurement window configuration, a measurement configuration parameter, and a reference signal identifier; wherein
the terminal device identifier is an identifier of the first terminal device;
the type of the to-be-measured reference signal is used to indicate a type of the reference signal;

the measurement window configuration is used to indicate a measurement time interval;

the measurement configuration parameter is used to determine a quantity of measurement results that need to be reported and types of the measurement results; and the reference signal identifier is the identifier of the reference signal sent by the first terminal device to the second terminal device.

12. The method according to claim 9, wherein the measurement configuration information comprises a terminal device list, a type of a to-be-measured reference signal, a measurement window configuration, a measurement configuration parameter, and a reference signal identifier; wherein the terminal device list comprises at least two terminal device identifiers that correspond one-to-one to at least two terminal devices, wherein the at least two terminal device identifiers are determined by the first terminal device;

the type of the to-be-measured reference signal is used to indicate a type of the reference signal;

the measurement window configuration is used to indicate a measurement time interval;

the measurement configuration parameter is used to determine a quantity of measurement results that need to be reported and types of the measurement results; and the reference signal identifier is used to determine, in a plurality of reference signals sent by the first terminal device, the reference signal that needs to be measured by the second terminal device.

13. A terminal device operating as a first terminal device, comprising:

an obtaining unit, configured to obtain measurement configuration information;

a sending unit, configured to send the measurement configuration information to a second terminal device, wherein the measurement configuration information is used to instruct the second terminal device to measure, based on the measurement configuration information, a reference signal received by the second terminal device from the first terminal device, to obtain a measurement result of the reference signal; and the sending unit is further configured to send the reference signal to the second terminal device; and a receiving unit, configured to receive the measurement result of the reference signal sent by the second terminal device.

14. The terminal device according to claim 13, wherein the obtaining unit is configured to receive the measurement configuration information sent by a base station, wherein the measurement configuration information comprises a time-frequency resource list, a terminal device list, a type of a to-be-measured reference signal, a measurement window configuration, a measurement configuration parameter, and a reference signal identifier; wherein the time-frequency resource list is used to indicate a position of a to-be-measured time-frequency resource;

the terminal device list comprises at least one terminal device identifier that corresponds one-to-one to at least one terminal device, wherein the at least one terminal device identifier comprises an identifier of the first terminal device;

the type of the to-be-measured reference signal is used to indicate a type of the reference signal;

the measurement window configuration is used to indicate a measurement time interval;

the measurement configuration parameter is used to determine a quantity of measurement results that need to be reported and types of the measurement results; and the reference signal identifier is used to determine, in a plurality of reference signals sent by the first terminal device, the reference signal that needs to be measured by the second terminal device.

15. The terminal device according to claim 14, wherein the sending unit is further configured to send a sidelink synchronization signal (SLSS) to a plurality of terminal devices in a group comprising the second terminal device;

the receiving unit is further configured to receive feedback information sent by the second terminal device, wherein the feedback information is used by the first terminal device to determine that the second terminal device has performed a synchronization operation based on the SLSS; and the sending unit is further configured to send indication information to the base station based on the feedback information, wherein the indication information is used to indicate the base station to send the measurement configuration information to the first terminal device.

16. The terminal device according to claim 15, wherein the obtaining unit is configured to generate the measurement configuration information comprising a terminal device identifier, a type of a to-be-measured reference signal, a measurement window configuration, a measurement configuration parameter, and a reference signal identifier; wherein the terminal device identifier is the identifier of the first terminal device;

the type of the to-be-measured reference signal is used to indicate a type of the reference signal;

the measurement window configuration is used to indicate a measurement time interval;

the measurement configuration parameter is used to determine a quantity of measurement results that need to be reported and types of the measurement results; and the reference signal identifier is the identifier of the reference signal sent by the first terminal device to the second terminal device.

17. The terminal device according to claim 16, wherein the sending unit is further configured to send a sidelink synchronization signal (SLSS) to a plurality of terminal devices in a group comprising the second terminal device; wherein the receiving unit is further configured to receive feedback information sent by the second terminal device, wherein the feedback information is used by the first terminal device to determine that the second terminal device has performed a synchronization operation based on the SLSS; and wherein the sending unit is configured to send the measurement configuration information to the second terminal device based on the feedback information.

18. The terminal device according to claim 15, wherein the obtaining unit is configured to generate the measurement configuration information comprising a terminal device list, a type of a to-be-measured reference signal, a measurement window configuration, a measurement configuration parameter, and a reference signal identifier; wherein the terminal device list comprises at least two terminal device identifiers that correspond one-to-one to at least two terminal devices, wherein the at least two terminal device identifiers are determined by the first terminal device;

the type of the to-be-measured reference signal is used to indicate a type of the reference signal;

the measurement window configuration is used to indicate a measurement time interval;

the measurement configuration parameter is used to determine a quantity of measurement results that need to be reported and types of the measurement results; and the reference signal identifier is used to determine, in a plurality of reference signals sent by the first terminal device, the reference signal that needs to be measured by the second terminal device.

19. The terminal device according to claim 16, wherein the sending unit is configured to send synchronization information to the second terminal device, wherein the synchronization information comprises an SLSS and the measurement configuration information, and the SLSS is used by the second terminal device to perform a synchronization operation based on the SLSS.

20. The terminal device according to claim 13, wherein the sending unit is configured to send the reference signal to a plurality of terminal devices in a group comprising the second terminal device; or send a sidelink synchronization signal (SLSS) to a plurality of terminal devices in a group comprising the second terminal device; receive feedback information sent by the second terminal device, wherein the feedback information is used by the first terminal device to determine that the second terminal device has performed a synchronization operation based on the SLSS; and send the reference signal to the second terminal device based on the feedback information.

* * * * *